J. S. THOMPSON.
TYPE CASTING AND COMPOSING MACHINE.
APPLICATION FILED NOV. 1, 1905.

1,119,769.

Patented Dec. 1, 1914.
15 SHEETS—SHEET 2.

Witnesses
John Braunwalder
R. B. MacIntosh

Inventor
John S. Thompson
By Hill & Hill
Att'ys

J. S. THOMPSON.
TYPE CASTING AND COMPOSING MACHINE.
APPLICATION FILED NOV. 1, 1905.

1,119,769.

Patented Dec. 1, 1914.
15 SHEETS—SHEET 5.

Witnesses:
John Braunwalder
R. B. MacIntosh

Inventor:
John S. Thompson
By Hill & Hill
Att'ys

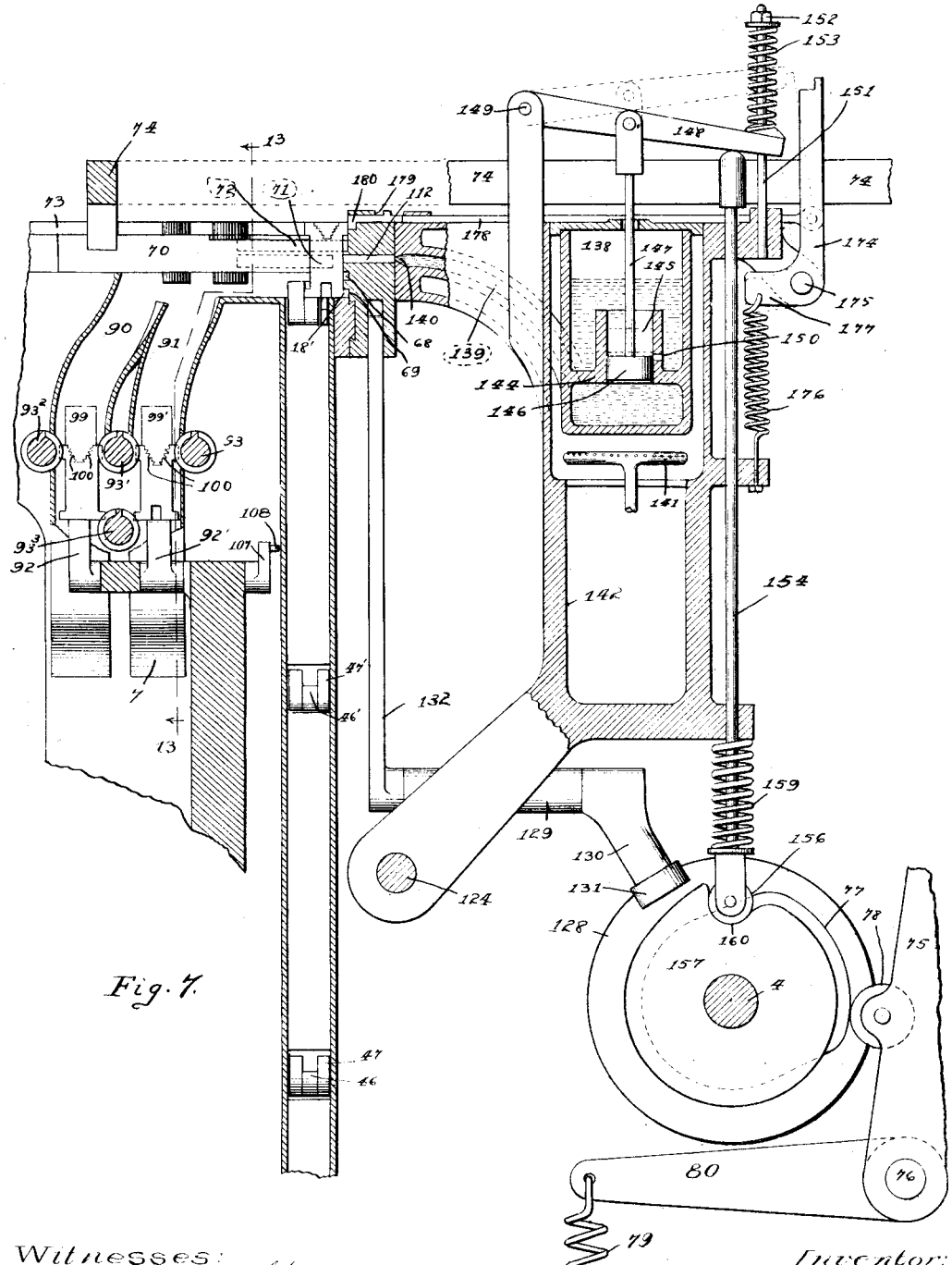

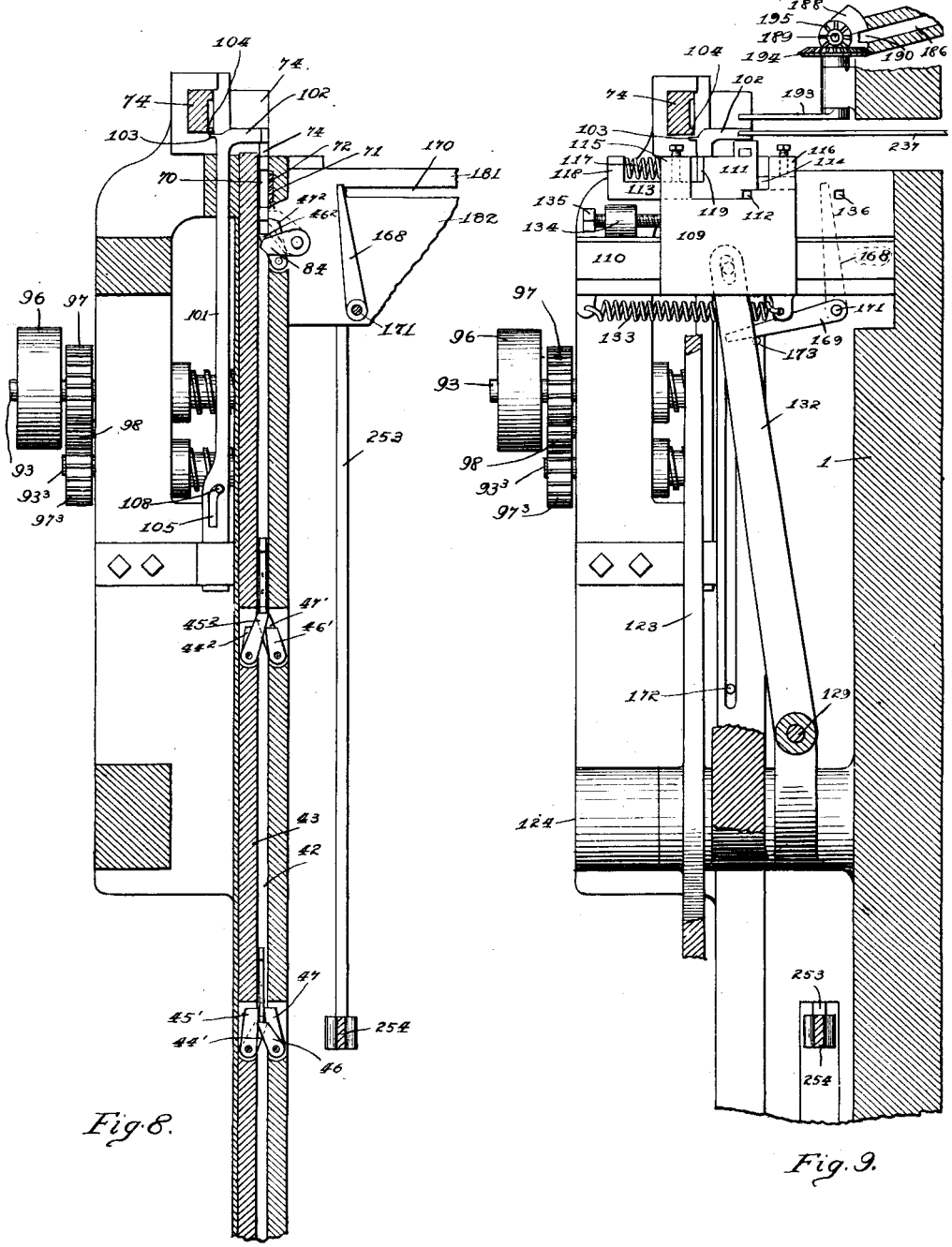

J. S. THOMPSON.
TYPE CASTING AND COMPOSING MACHINE.
APPLICATION FILED NOV. 1, 1905.

1,119,769.

Patented Dec. 1, 1914.
15 SHEETS—SHEET 9.

Witnesses:
John N Braunwalder
R. B. MacIntosh

Inventor:
John S. Thompson
By Hill & Hill
Att'ys

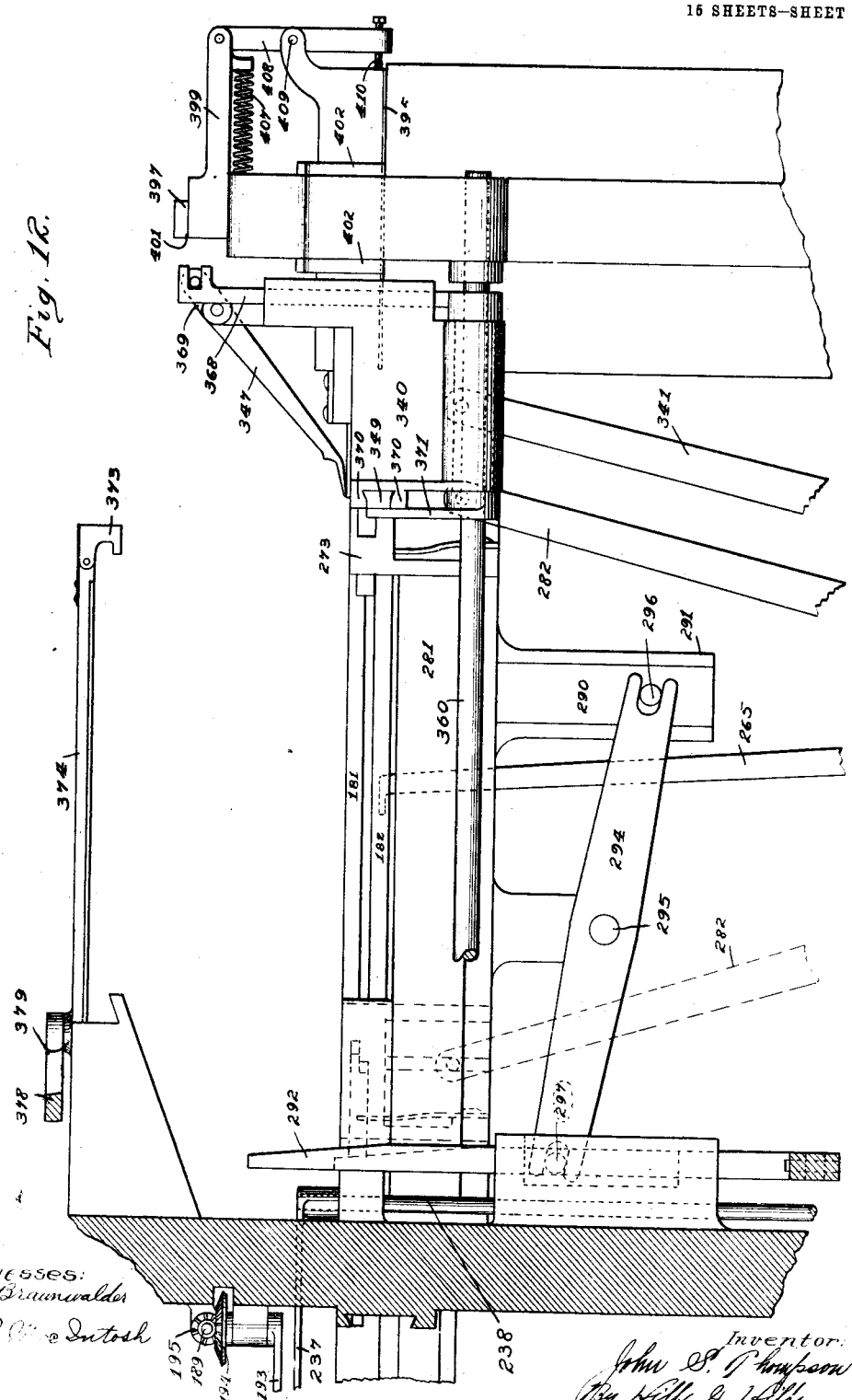

J. S. THOMPSON.
TYPE CASTING AND COMPOSING MACHINE.
APPLICATION FILED NOV. 1, 1905.

1,119,769.

Patented Dec. 1, 1914.
15 SHEETS—SHEET 11.

Witnesses:
John Braunwalder
R. B. Mac Intosh.

Inventor:
John S. Thompson
By Hill & Hill
Att'ys

J. S. THOMPSON.
TYPE CASTING AND COMPOSING MACHINE.
APPLICATION FILED NOV. 1, 1905.
1,119,769.
Patented Dec. 1, 1914.
15 SHEETS—SHEET 12.
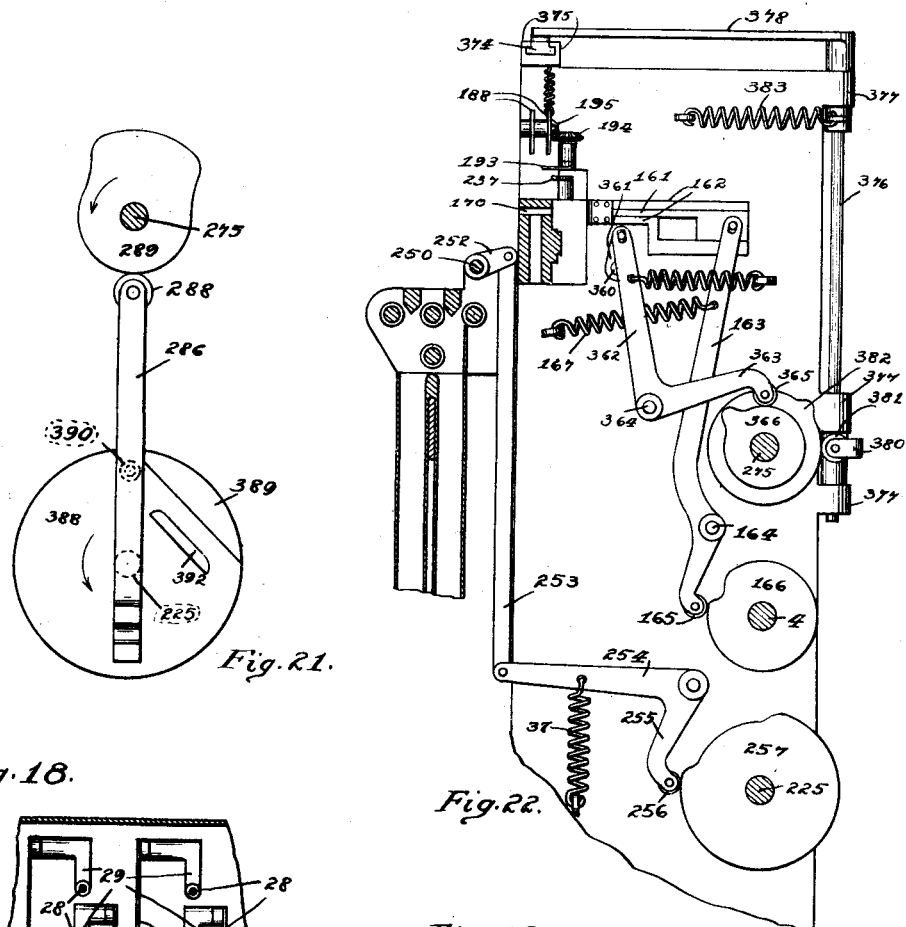
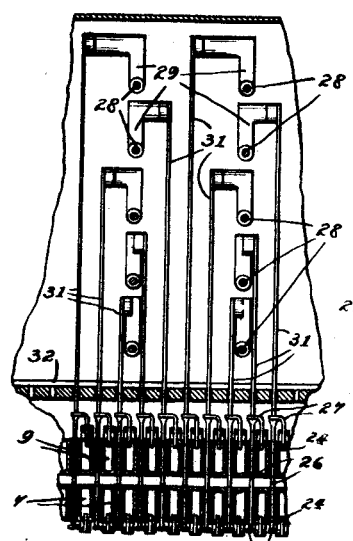
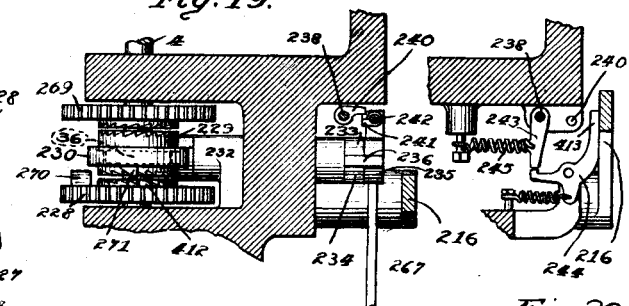
Witnesses:
John Braunwalder
R. B. MacIntosh
Inventor.
John S. Thompson
By Hill & Hill
Att'ys

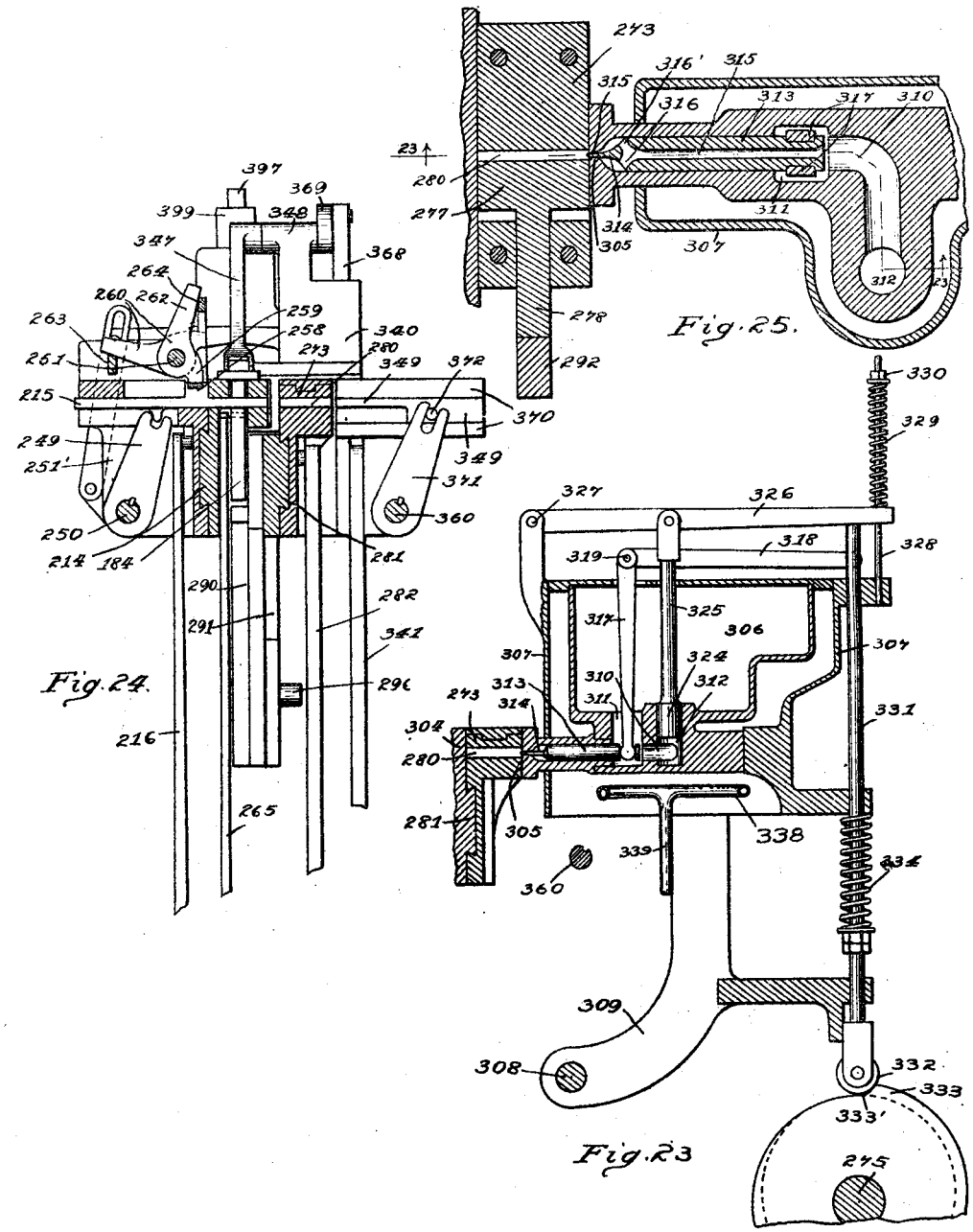

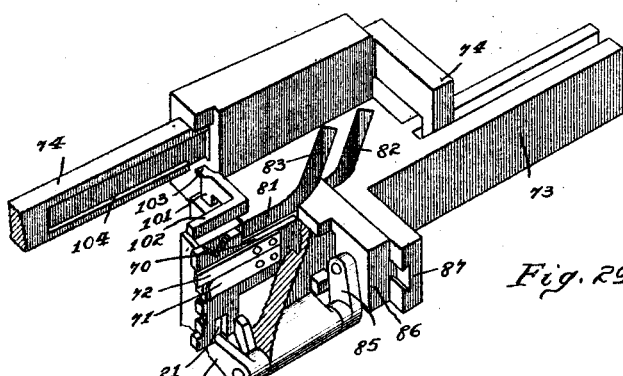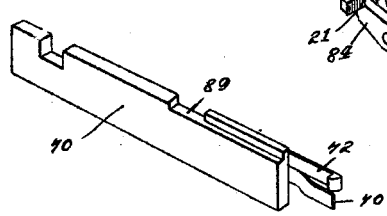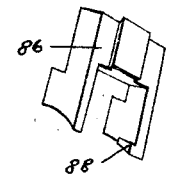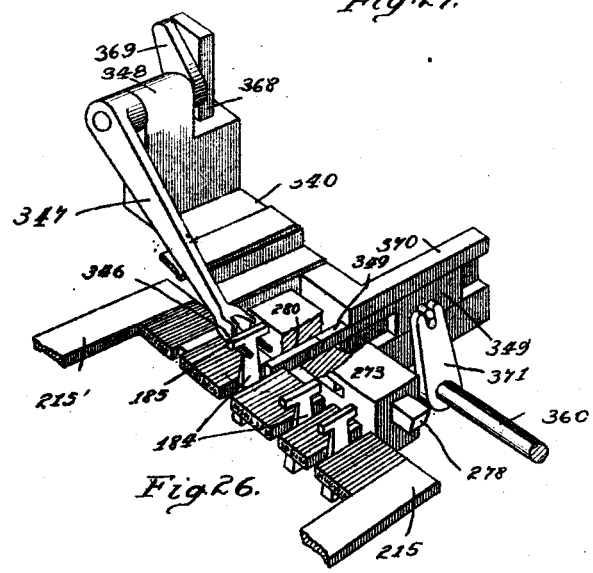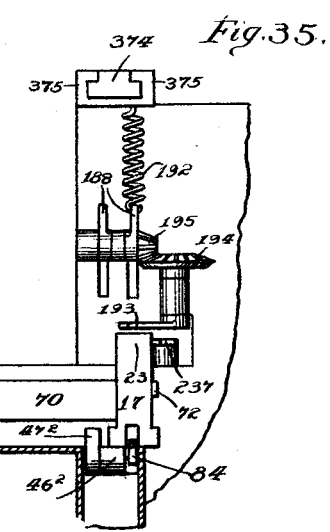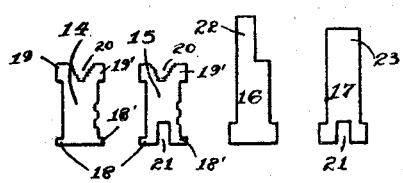

J. S. THOMPSON.
TYPE CASTING AND COMPOSING MACHINE.
APPLICATION FILED NOV. 1, 1905.

1,119,769.

Patented Dec. 1, 1914.
15 SHEETS—SHEET 15.

Witnesses:
John Braunwalder
Charles J. Cobb

Inventor:
John S. Thompson
By Hill & Hill
Att'ys

UNITED STATES PATENT OFFICE.

JOHN S. THOMPSON, OF CHICAGO, ILLINOIS.

TYPE CASTING AND COMPOSING MACHINE.

1,119,769.  Specification of Letters Patent.  Patented Dec. 1, 1914.

Application filed November 1, 1905. Serial No. 285,497.

*To all whom it may concern:*

Be it known that I, JOHN S. THOMPSON, a citizen of the United States, residing at Chicago, county of Cook, and State of Illinois, have invented certain new and useful Improvements in Type Casting and Composing Machines, of which the following is a description.

My invention relates to that class of mechanisms known as type casting and setting machines and more particularly to that division of the class in which the product consists in lines of justified individual type.

The object of my invention is to produce a compact, reliable, and convenient machine of the kind described wherein all the various operations of the machine are automatically performed, but controlled by the manipulation of a series of keys or levers.

To this end my invention consists in the novel construction, arrangement and combination of parts herein shown and described and more particularly pointed out in the claims.

Figure 1:
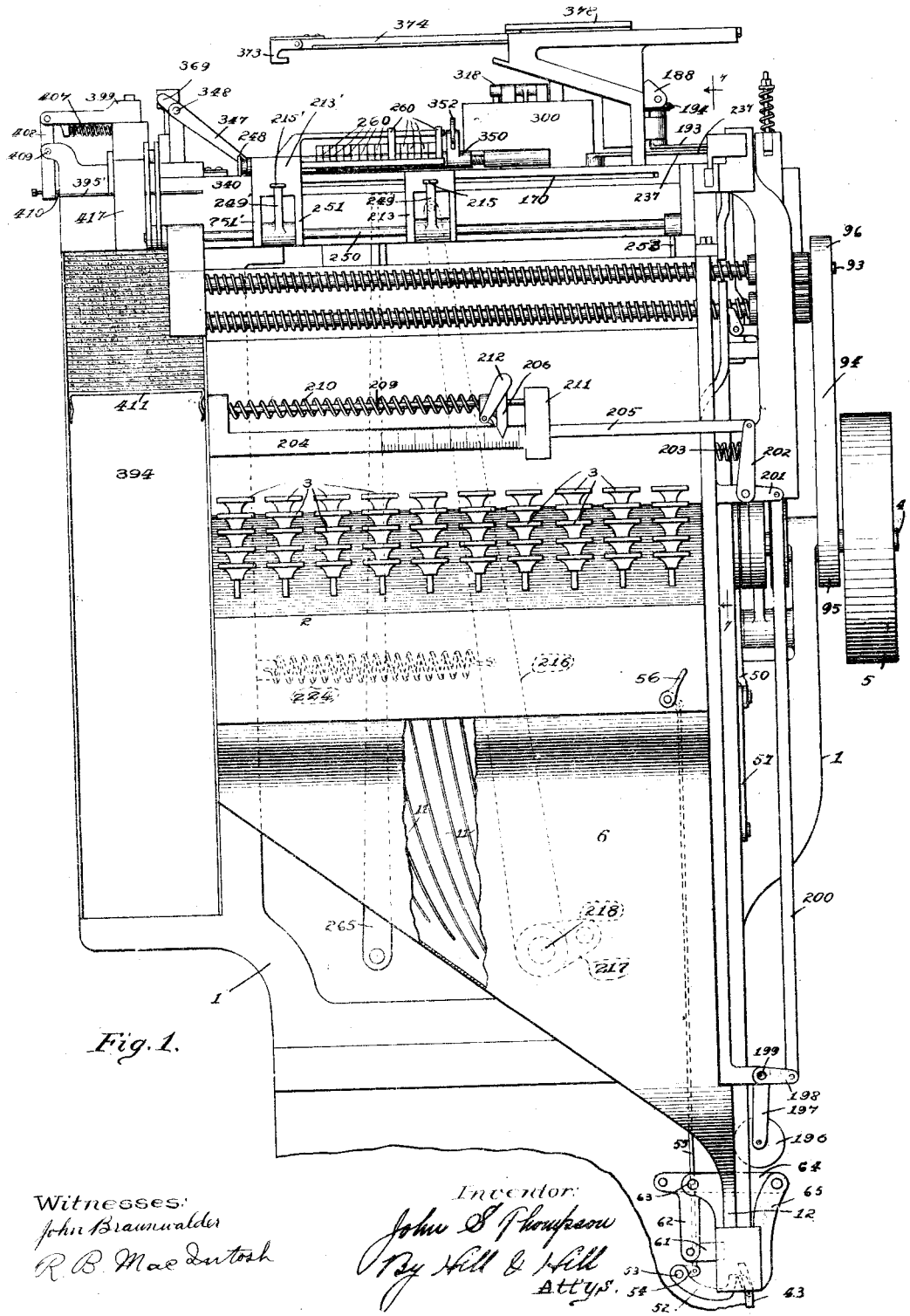
Figure 2:
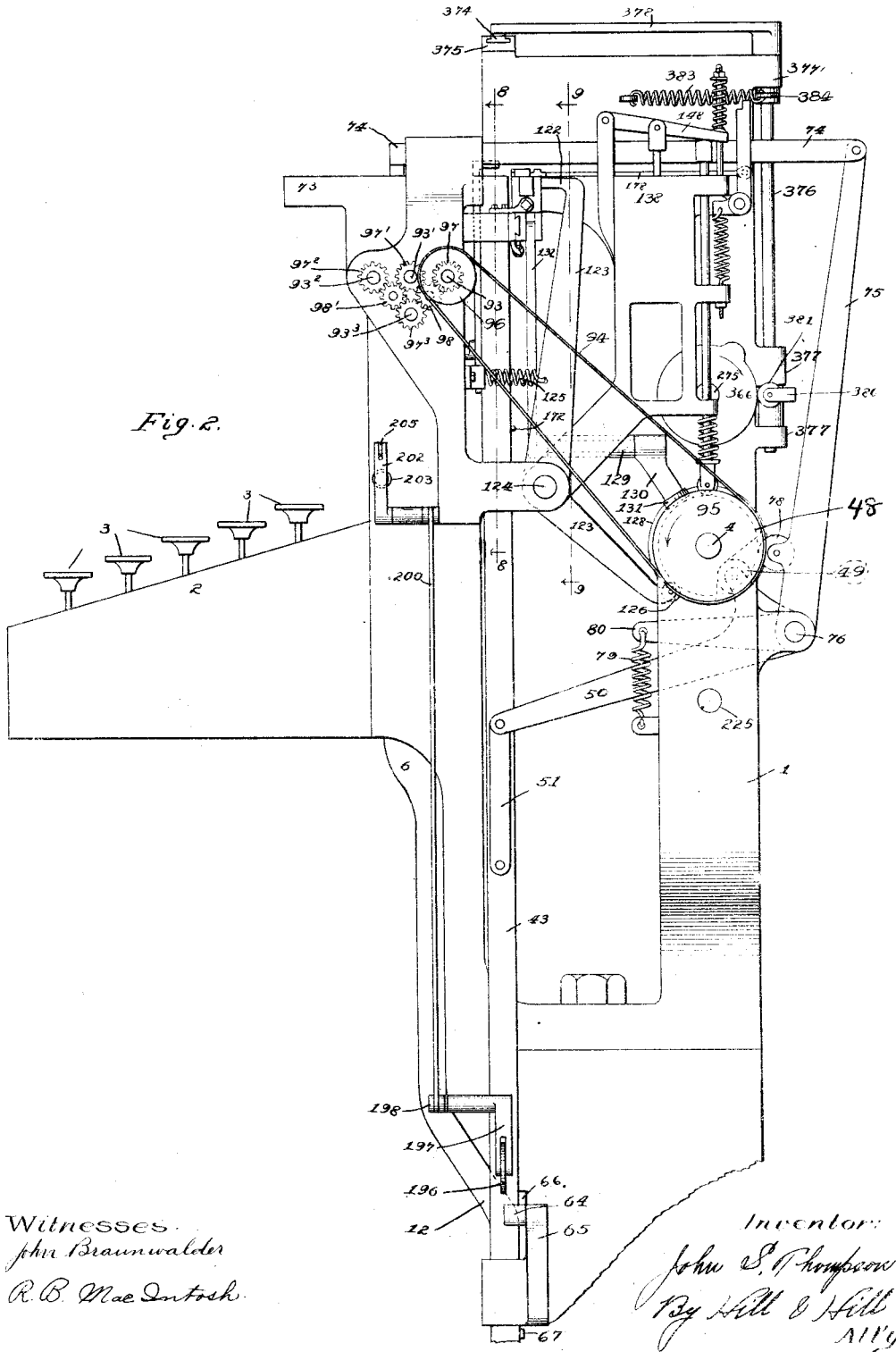
Figure 3:
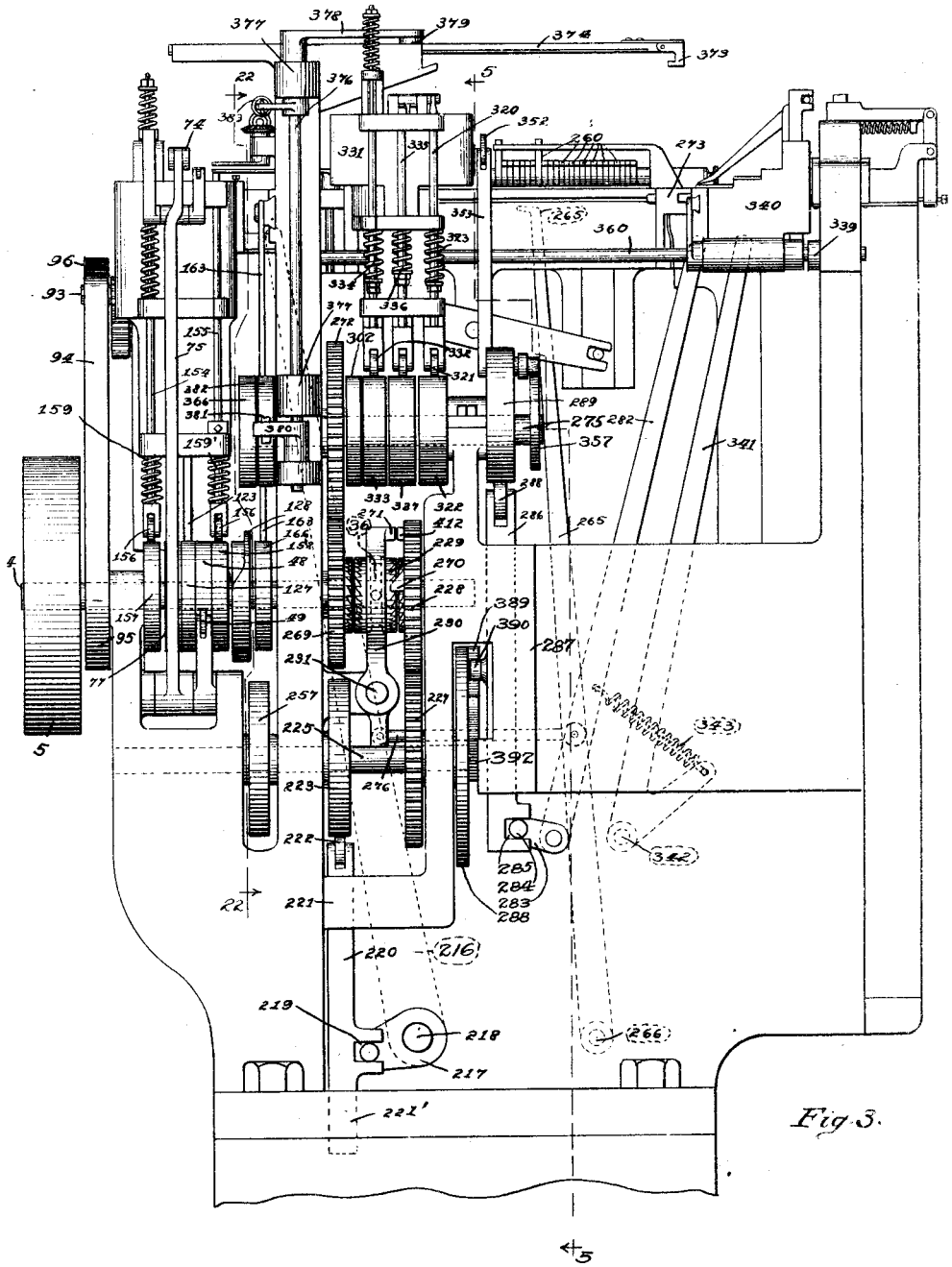
Figure 4:
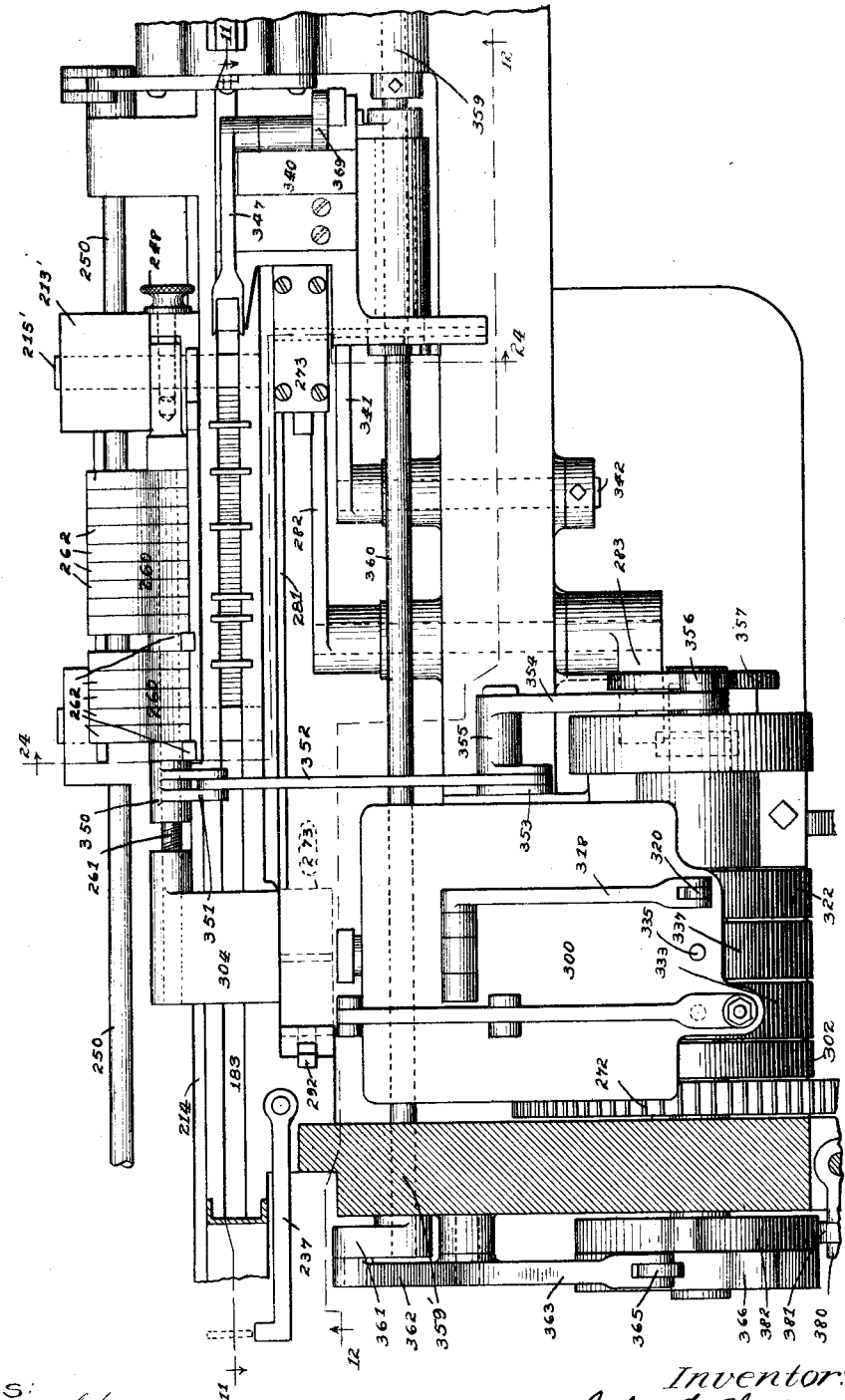
Figures 5, 6:
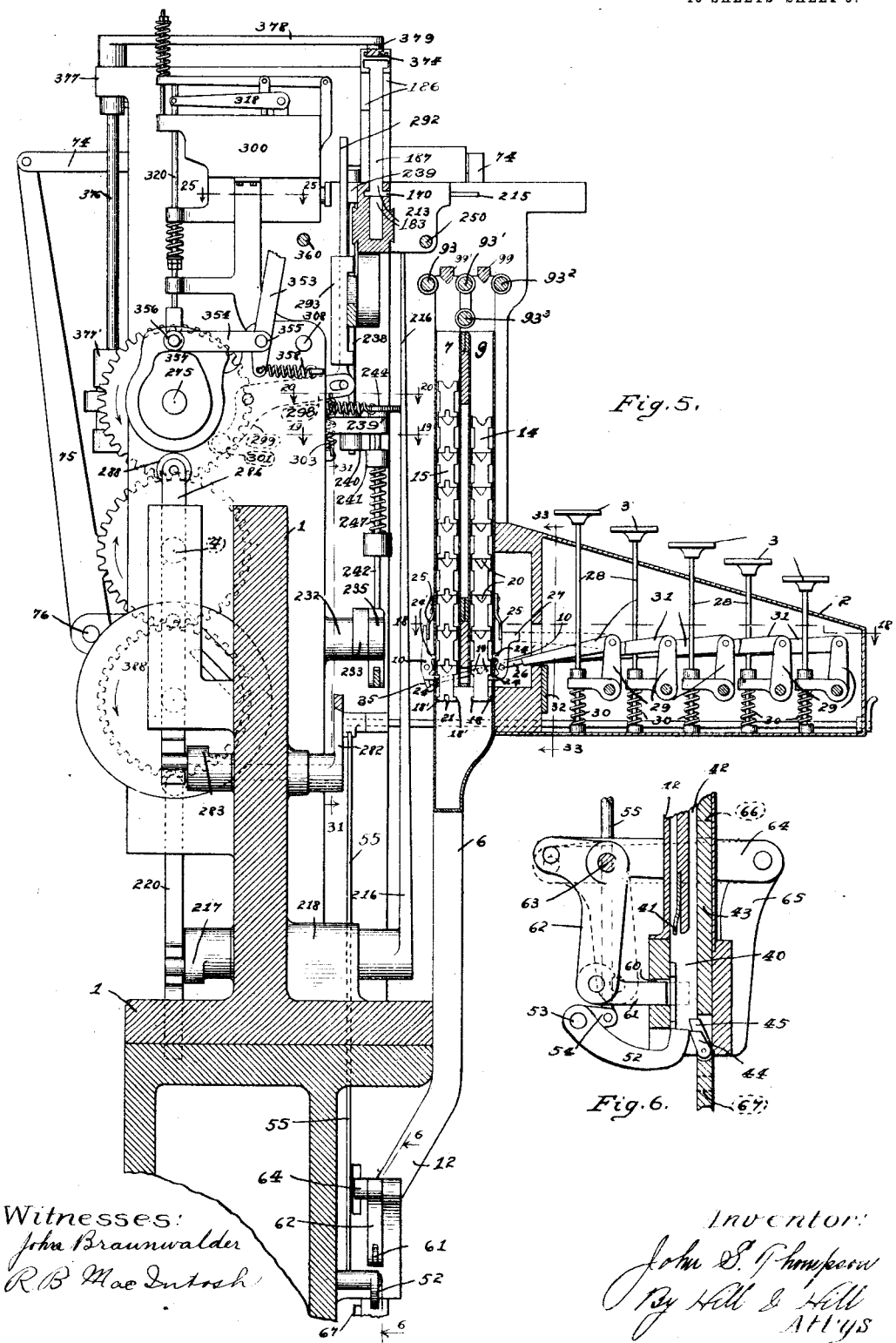
Figure 10:
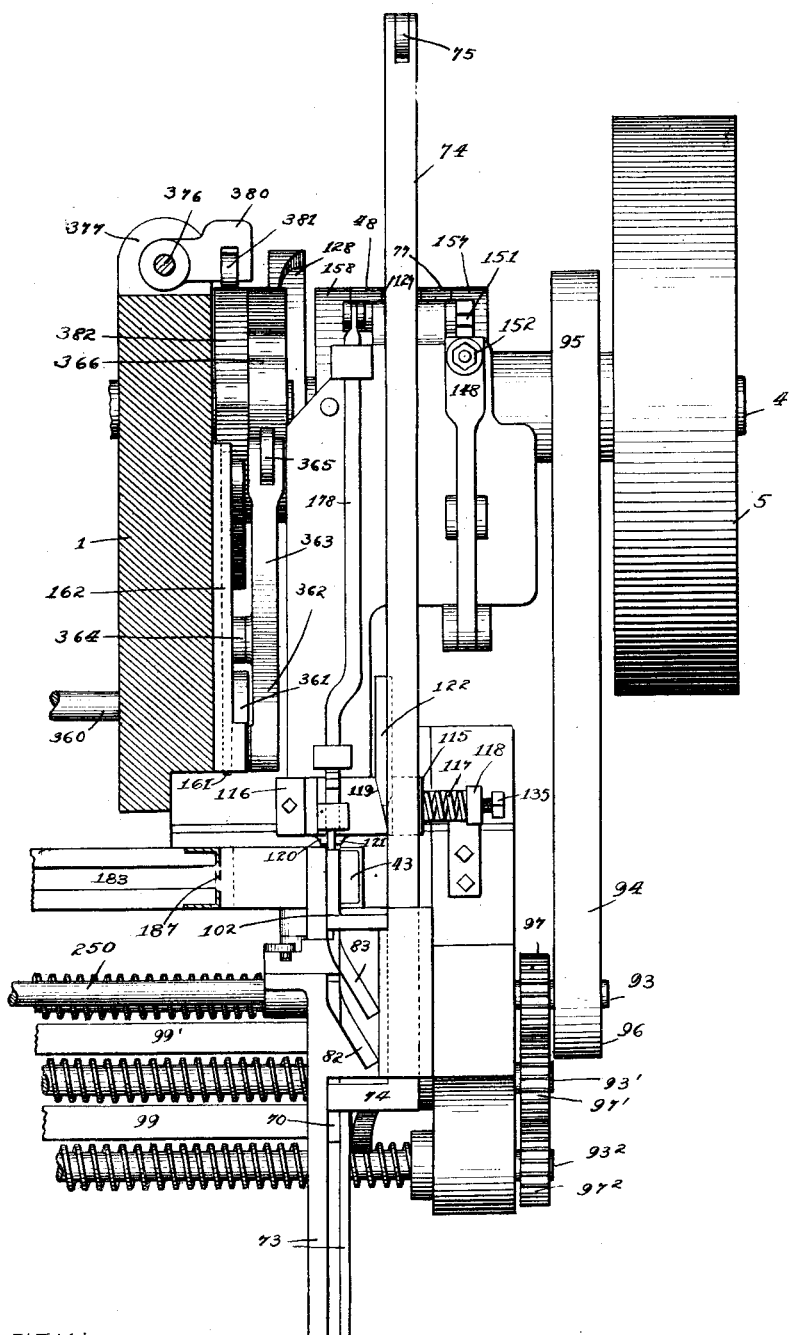
Figure 11:
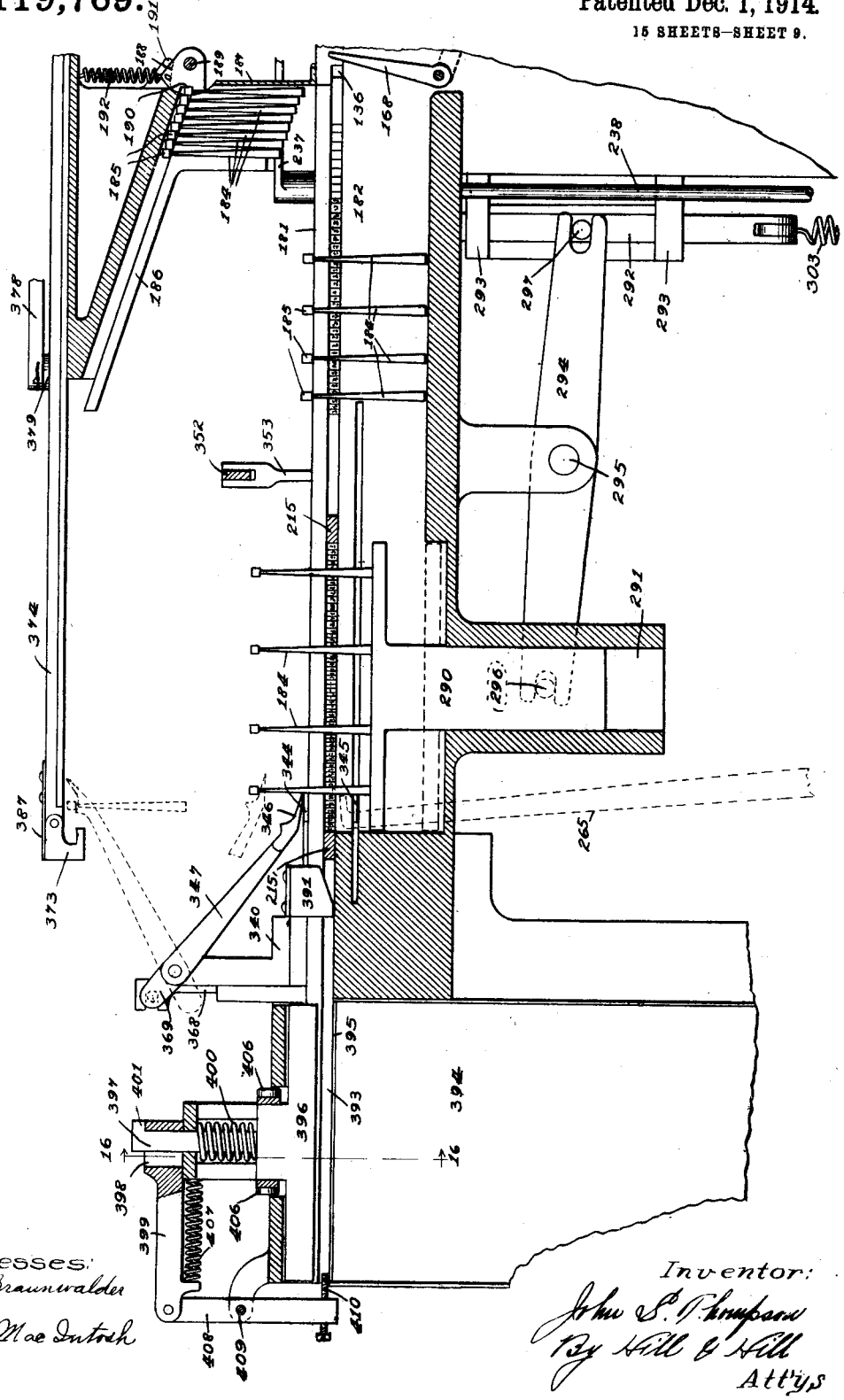
Figure 16:
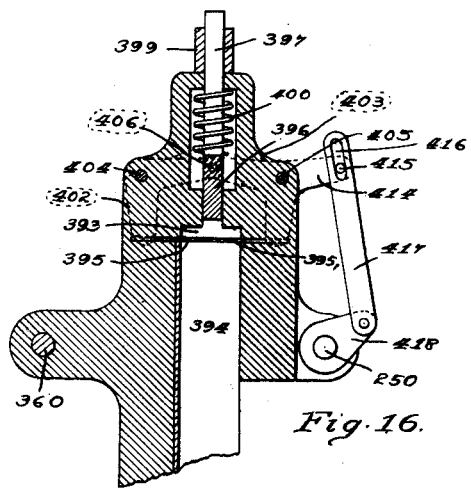
Figure 17:
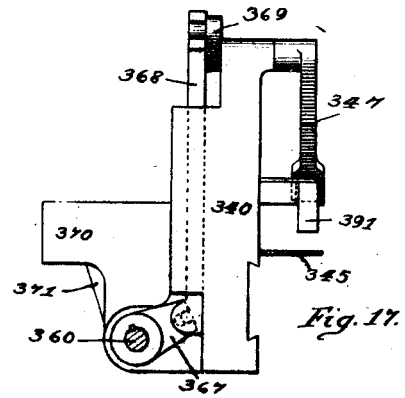
Figure 15:
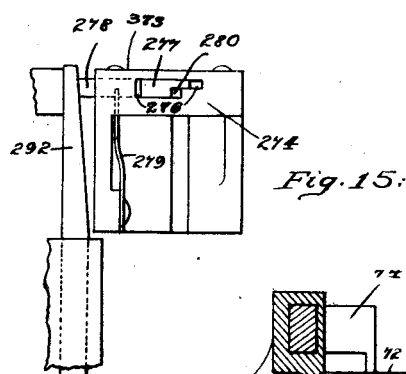
Figure 14:
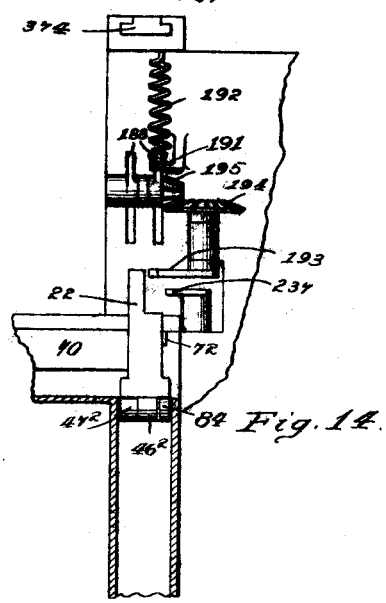
Figure 13:
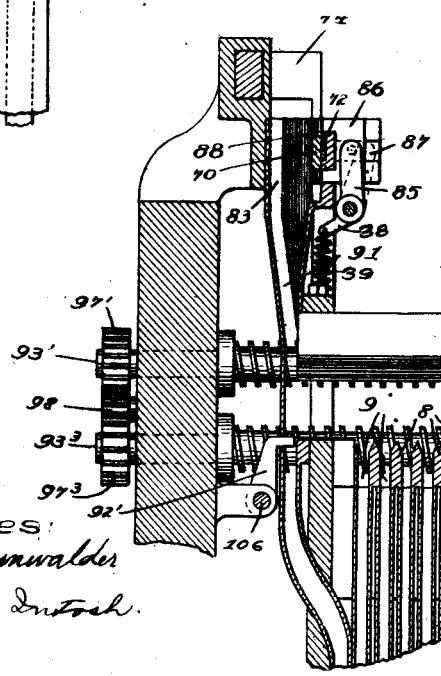
Figure 31:
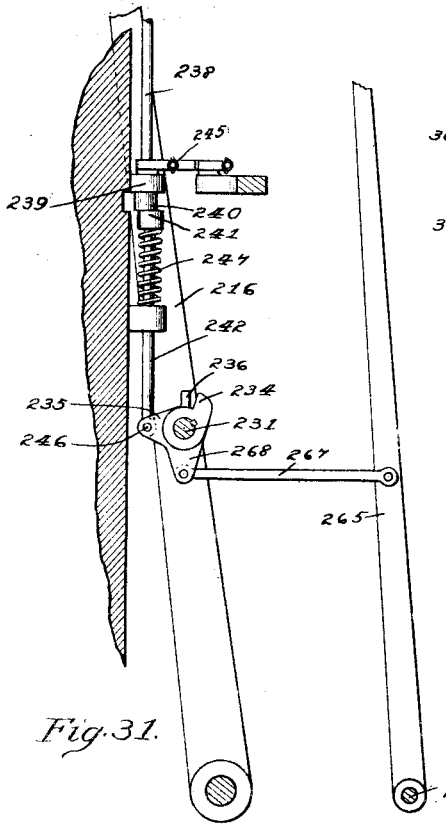
Figure 30:
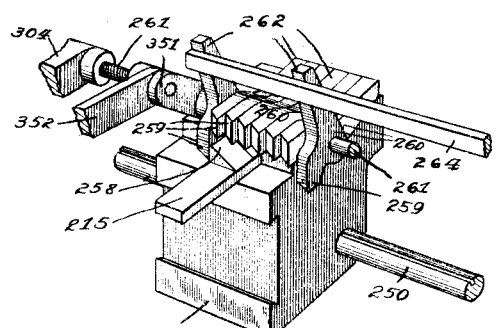
Figure 32:
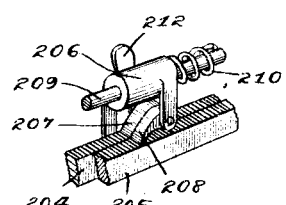
Figure 33:
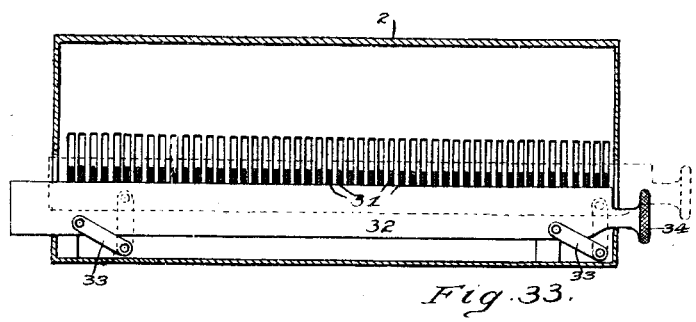

In the accompanying drawings, wherein like or similar reference characters indicate like or corresponding parts:—Figure 1 is a front elevation of my machine. Fig. 2 is a side elevation of the same with the driving pulley removed. Fig. 3 is a rear elevation. Fig. 4 is a top plan view of a part of my machine with parts broken away to more clearly show the construction. Fig. 5 is a section taken substantially on line 5—5 of Fig. 3. Fig. 6 is an enlarged partial section taken substantially on line 6—6 of Fig. 5. Fig. 7 is a section taken substantially on line 7—7 of Fig. 1. Fig. 8 is a section taken substantially on line 8—8 of Fig. 2. Fig. 9 is a section taken substantially on line 9—9 of Fig. 2. Fig. 10 is an enlarged plan view of the type casting and matrix distributing portion of my device with parts broken away to more clearly show the construction. Fig. 11 is a section of a part of my machine taken substantially on line 11—11 of Fig. 4. Fig. 12 is a section of the same parts of my device taken substantially on line 12—12 of Fig. 4. Fig. 13 is a partial section taken substantially on line 13—13 of Fig. 7. Fig. 14 is an enlarged detail showing a space releasing matrix in position at the mold. Fig. 15 is an enlarged detail of the space casting mold and associated parts. Fig. 16 is a partial section taken substantially on line 16—16 of Fig. 11. Fig. 17 is an enlarged detail of the space wedge extracting mechanism and carriage. Fig. 18 is a partial section taken substantially on line 18—18 of Fig. 5. Fig. 19 is a partial section taken substantially on line 19—19 of Fig. 5. Fig. 20 is a partial section taken substantially on line 20—20 of Fig. 5. Fig. 21 is a detail of the cams and coöperating parts for operating the mechanism for transferring the finished line to the galley. Fig. 22 is a partial section taken substantially on line 22—22 of Fig. 3. Fig. 23 is a partial section taken substantially on line 23—23 of Fig. 25. Fig. 24 is a partial section taken substantially on line 24—24 of Fig. 4. Fig. 25 is a partial section taken substantially on line 25—25 of Fig. 5, showing the metal pot and mold in casting position. Fig. 26 is a perspective view of a line of type and parts of the justifying mechanism. Figs. 27 and 28 are details. Fig. 29 is a perspective view of a matrix and portions of the matrix distributing mechanism. Fig. 30 is a perspective view of the line transferring carriage and its associated parts in justifying position. Fig. 31 is a partial section taken substantially on line 31—31 of Fig. 5. Fig. 32 is a perspective detail of the indicating mechanism. Fig. 33 is a partial section taken substantially on line 33—33 of Fig. 5. Fig. 34 is a detail of the several forms of matrices used in my device. Fig. 35 is a view similar to Fig. 14 showing a line transfer matrix in position at the mold.

In the preferred form of my device shown in the drawings, a frame 1 is provided to properly support the parts of the machine in their proper coöperating relation to each other. A rotatable shaft 4 is mounted in suitable bearings on the frame 1 and provided with cams, gears, or equivalent means which will be more specifically pointed out hereafter, for imparting the desired movements to the various parts of the machine. Any desired means may be employed to drive the shaft 4. As shown a driving pulley 5 is mounted at a convenient point upon the shaft, to receive a belt from any convenient source of power.

A pair of vertical magazines 6—7 are arranged near the front of the frame 1 preferably just back of and parallel to the key board 2 which is provided with a plurality of vertically movable keys 3—3 by the manipulation of which the operations of the machine are directed and partially controlled. The interior of the magazines 6—7 are divided by a series of substantially parallel transverse partitions 8—8 (Fig. 13) into a plurality of channels 9, each of which is of suitable size to contain a single vertical row or column of matrices. The lower end of each channel 9 is entirely open, dogs 10 or equivalent means arranged to be operated by a key being provided to control the discharge of matrices from the channels. Inclined chutes or ways 11 are arranged below the several channels 9 terminating at a common vertical receiver 12 (Fig. 6).

Four forms of loose metal blocks are employed in my machine, and stored in the magazines 6—7. These blocks for convenience throughout this specification are called matrices, although only two forms are provided with faces from which type are cast, the other two being merely dummies or blank pieces suitably formed to start the operation of various portions of the machine as they pass along certain paths or parts of my machine.

The type forming matrices 14 and 15 are preferably rectangular blocks of the general form shown in Fig. 34, in thickness accurately corresponding to the thickness of the type they are adapted to assist in forming.

In the form shown, two type face impressions are formed upon one edge of each matrix, rectangular, lateral projections 18, 18′ and 19, 19′ at the ends, and a toothed notch 20 in the upper end; the distinguishing features between these two forms of matrices being the styles of type faces upon their edges, and the shape of their lower ends. That of the matrix 14 is straight and continuous while that of the matrix 15 is broken by a notch 21 near its center. It will be observed that by employing these two forms of matrices in a machine four styles of type faces may be available for use as desired.

The non-type forming or dummy matrices 16 and 17 used to control the space releasing and line transferring mechanism also shown in Fig. 34 are preferably formed at their lower ends exactly the same as the matrices 14 and 15 respectively. At their upper ends, however, the notch 20 and projections 19 and 19′ are preferably omitted and a longitudinal extension 22 and 23 is provided upon each respectively. The extension 22 upon the space matrix 16 is preferably narrow and of considerable length, as shown, while the extension 23 upon the line matrix 17 is preferably the full width of the end of the matrix and shorter than the projection 22. Each dog 10 is pivotally mounted at the lower end of its channel and provided with two lugs 24 and 24′, so formed and spaced that when the dog is oscillated the two lugs will be alternately projected into and withdrawn from the channel, a spring 25 being provided to normally hold the lower lug 24 projecting into the channel, as shown in Fig. 5. When the dog 10 is oscillated the lower matrix is dropped, the next succeeding matrix being supported by one of its projections resting upon a lug 24′ until the dog 10 resumes its normal position, when the matrices move downward to a position where the supporting projection of the bottom matrix rests upon the lug 24.

In Fig. 5, the matrices 14 and 15 are shown, the supporting projection upon each being the projection 19 or 19′. Obviously, however, upon the matrices 16 and 17, the projections 18 and 18′ may serve the same purpose and all the parts operate in substantially the same manner. That is, at each oscillation of its detaining dog 10 a single matrix contained in the channel controlled by said dog will be discharged by way of a chute 11 into the receiver 12.

The movements of the dogs 10 may be controlled by the keys 3 in any suitable manner. As shown, each of the dogs 10 controlling the rear magazine is provided with a projection 35 and a bar 26 with one end in contact with the projection 35, the other end extending forward between the channels 9 toward the keys to a point below the projections 27 upon the dogs 10 controlling the front magazine. Each key 3 is connected by a rod 28 to one arm of a bell crank 29, a spring 30 being provided to hold the arm of the bell crank and the key normally in their elevated positions. A finger 31 is pivotally attached to the free arm of the bell crank 29 and so proportioned that the free end of the finger may be brought in position to engage the end of the bar 26, as shown in full lines in the drawings, or the projection 27, as shown in broken lines, at will, by merely elevating or depressing the free ends of the fingers, and thus, by the operation of any of the keys 3, discharging matrices from either the front or rear series of channels as desired.

Any desired mechanism may be provided to control the vertical position of the free ends of the fingers 31. As shown (in Figs. 5 and 33) a plate 32 is provided to support the free ends of the fingers and attached to the adjacent portions of the machine by means of links 33 preferably so arranged that when in the position shown the plate rests upon suitable stationary supports near its ends, but may be elevated as shown in broken lines by moving the plate longitudinally when it is supported by the links substantially parallel to its former position. A knob 34 is provided at one end of the plate 32 to move the same as above described.

Any desired means may be employed to successively elevate the matrices from the receiver 12 and place the same in suitable position in the casting portion of my machine. As shown, the lower end of the receiver 12 is widened to form a chamber 40 (see Fig. 6), a spring 41 being provided to prevent the disarrangement of the matrices as they enter the chamber. The chamber 40 also forms the lower extremity of a substantially vertical duct 42 of suitable cross section to contain any of the matrices used in my machine. At one side of the duct 42 is positioned a vertically movable bar 43 provided with movable pawls 44, 45,—44', 45'—44² 45² etc, regularly spaced its entire length, as shown in (Figs. 6 and 8). Similar pawls 46, 47—46', 47' etc, are positioned in the opposite wall of the duct 42 (see Figs. 7 and 8) and spaced the same as the pawls 44, and 45. Any suitable means may be employed to vertically reciprocate the bar 43. As shown, a suitably formed cam 48 is mounted upon the shaft 4, (see Fig. 2) and connected to the bar 43 by a roller 49, arm 50 and link 51, all the parts being so proportioned and arranged that the movement of the bar will be slightly greater than the distance between the pawls, and when the bar is in its extreme upper or lower position the top faces of all the pawls 44 and 45 will substantially register with the faces of all the pawls 46 and 47, respectively, as shown in Fig. 8.

In order that matrices of the various forms may be presented in an appropriate manner to the coöperating parts of my machine, a stop 52 is arranged in the bottom of the chamber 40, and preferably made movable so that it may be brought into registry with either the pawls 44 or the pawl 45 on the bar 43. In the form shown, the stop is pivotally mounted on the frame 1 at 53, and provided with an arm 54. A rod 55 connects the arm 54 to a lever 56 positioned conveniently to the key-board of the machine so that the operator may control the position of the stop as desired.

As heretofore described, the matrices enter the chamber 40 at one side from the receiver 12, and are discharged from the opposite side of the chamber 40 through the duct 42. The throat or receiver 12 is so proportioned that in the event of matrices being released into the receiver 12 faster than the bar 43 removes them from the chamber 40, they will accumulate in a vertical column, and be there retained until the removal of the lowermost matrices permits them to fall into the chamber 40. Any suitable mechanism may be employed to successively move the matrix at the receiving side of the channel 40 to the discharge side.

As shown, an opening 60 is formed through the wall of the chamber 40 on the receiving side, so positioned as to expose the central portion of any matrix in the chamber. The free end of a finger 61 is positioned in the opening 60 and its opposite end pivotally attached to one arm of a bell crank 62, pivoted to the frame 1 at 63. The opposite arm of the bell-crank 62 is connected by a link 64 in such a position that as the bar 43 nears the bottom of its stroke, a lug 66 upon the bar engages the link 64, depressing it, and thus forcing the end of the finger 61 through the opening 60 into the chamber 40 and carrying any matrix in the chamber over to the discharge side and holding it against the side of the chamber until it is engaged and carried upward by the pawl 44 or 45 as the bar 43 moves upward.

As the bar 43 nears the upper end of its stroke, a second lug 67 upon the bar engages the link 64, moving the parts in the opposite direction and withdrawing the finger 61 from the chamber, allowing the next matrix in the receiver 12 to descend into position to be transferred across the chamber.

Obviously, in the movements just described as the bar 43 arrives at the upper limit of its movement the matrix engaged and carried upward by the pawl 44 or 45 passes slightly above the end of the pawl 46 or 47 as the case may be and when the bar 43 commences its downward movement the pawl 46 or 47 will engage the matrix and support the same. When the bar 43 again reaches the lower limit of its movement the pawl 44' or 45' passes the matrix and upon the next upward movement of the bar 43 engages and carries the matrix upward to the pawl 46' or 47' and so on until the matrix is finally placed upon the pawl 46² or 47² as the case may be and in position at the type mold to coöperate therewith to cast a type (see Fig. 7).

As before described, each type-forming matrix is provided with two type face-impressions on its side. If the operator desires to cast a type from the lower face, the stop 52 is elevated so that the pawls 45 and 47 engage the matrix, and it is finally positioned before the mold with its projection 18' opposite a notch 68. (See Fig. 7.) If, however, a type from the upper type face is desired, the stop 52 is depressed so that the pawls 44 and 46 engage the matrix, and it is finally positioned with its projection 18' opposite a notch 69. The notches 68 and 69 are preferably formed slightly larger than the projections 18' to insure the free entrance of the projection into the notch when the matrix is moved backward against the mold face, a final slight upward movement of the bar 43 forcing the projection 18' firmly against the top of the notch after the matrix is otherwise in position, and thus bringing the type face upon the matrix into exactly its proper vertical relation with the mold. In the form shown, the horizontal movements of the matrix at this point are controlled by a horizontal bar 70, provided at its end adjacent the mold with a spring 71 and a spring-hook 72. The hook is so formed that when the end of the bar is in contact with one edge of a matrix, the hook will extend across and engage the opposite edge, thus temporarily attaching the matrix to the bar. The spring 71 is formed to rest against the side of the matrix when so attached. The bar 70 is supported by the guides 73 (Figs. 7 and 10), and its horizontal movements are controlled by an arm 74, at one end suitably attached to the bar 70, and at its opposite end to a lever 75, pivotally connected to the frame 1 at 76.

A suitably formed cam 77 is mounted upon the shaft 4, and a roller 78 is mounted upon the lever 75 in suitable position to bear upon the face of the cam and thus transmit the desired movements to the bar 70. A spring 79 is provided extending from an extension 80 of the lever 75 to a suitable part of the frame to normally maintain the roller 78 in contact with the cam face. The parts are so formed and timed that at the instant the pawls $44^3$ or $45^3$ position a matrix before the mold, the bar 70 advances, moves the matrix horizontally into contact with the mold, and, after the pawls have given the matrix its final upward movement heretofore explained, the bar 70 firmly presses the matrix against the mold while a type is being formed. As the matrix is pressed toward the mold, its inner edge is engaged by the hook 72, and as soon as a type is formed in the mold the bar 70 recedes, carrying the matrix with it along the channel 81 to its terminal 82 or 83, as the case may be.

In the form shown, the matrices 14 and 16 are arranged to enter the terminal 82, while the matrices 15 and 17 enter the terminal 83, thus at once dividing the matrices at this point into two general distributing classes, the former to be stored in the front magazine or series of channels 9, and the latter in the rear magazine. It should be observed that all the matrices entering the terminal 83 are provided with the notch 21, while in those passing into the terminal 82 the notch is omitted. To produce this division, a lever 84 (see Figs. 8 and 29) is provided, projecting normally into the upper end of the duct 42 near the mold.

The lever 84 forms one arm of a bell crank, suitably mounted upon the frame, with its other arm 85 attached to a horizontally movable block 86, mounted in suitable ways or guides 87 and arranged to move at an angle to the bar 70. A projection 88 is also formed upon the arm 85 (see Fig. 13), and a spring 89 is provided extending from near the extremity of the projection 38 to a suitable point upon the frame of my machine to normally hold the block 86 and its associated parts in the position shown in Fig. 29, that is, with the free end of the lever 84 projecting into the duct 42, the block 86 extends across a part of the channel 81, completely cutting off the terminal 82, the face of the block being formed to guide the matrices from the channel 81 into the terminal 83. As each matrix nears the top of the duct 42 it engages the lever 84, moves the block 86 back out of its normal position, and thus opens the channel 81 to the terminal 82. The lever 84 is so positioned that when any matrix provided with a notch 21 is in casting position at the mold, the free end of the lever 84 is in position to drop through the notch to its normal position. A lug 88 (see Figs. 27 and 28) upon the block 86 passes through a notch 89 upon the bar 70 as the block and associated parts return to their normal position.

As soon as a type is cast from a matrix provided with a notch 20, the bar 70 retracts the matrix from the mold along the channel 81, until it engages the curved face of the block 86, when it is deflected into the terminal 83, and thus disengaged from its position between the hook 72 and the end of the bar, the block 86 being locked against moving from its normal position during this operation by the lug 88 engaging the upper edge of the bar 70. If, however, the matrix positioned at the mold is not provided with a notch 21, the lever 84 is supported by the matrix while at the mold, and before the matrix is moved far enough to release the lever, the notch 89 has moved out of the path of the lug 88, and the block is locked against returning to its normal position until the matrix is beyond the block, when the matrix is discharged into the terminal 82 in the same manner as the other series of matrices are discharged into the terminal 83, and the parts resume their normal positions.

The terminals 82 and 83 are the entrances to the curved tubes 90 and 91 (see Fig. 7) leading to the distributer screws. As the matrices 14 and 15 enter these tubes, they fall by gravity to a point between the respective screws, where they are temporarily supported by the stops 92 and 92', respectively. The distributer screws 93, 93', $93^2$ and $93^3$ may be rotated by any suitable means. As shown, a belt 94, rotatably connects a pulley 95 upon the shaft 4 with a pulley 96 mounted upon the projecting end of the screw 93. Suitable spur gears 97, 97', $97^2$ and $97^3$ are mounted upon the respective screws, and intermediate pinions 98 and 98' are mounted upon suitable bearings on the frame 1 of the machine, intermeshing respectively with the gear 97, 97' and $97^3$ and the gears 47', $97^2$ and $97^3$, as shown in Fig.

2. The distributing screws are in this manner all rotated in the same direction and at the same speed. Distributer bars 99 and 99' (see Figs. 7 and 13) are provided, each positioned, respectively, above the front and rear magazines, each bar being provided with a portion at its lower edge positioned substantially between and parallel with two of the distributer screws, formed to fit the general outline of the notch 20, and provided with a plurality of ridges or projections 100.

The teeth of the toothed notch 20 of each matrix are formed to engage one or more of the ridges 100 at each side of the bar 99 to support the matrix, the teeth upon the various matrices for producing different characters being so formed that, by interrupting a portion of the ridges 100 at suitable points, certain matrices will be released from the bar 99 when they arrive at particular points upon the bar, and, by arranging these points in suitable relation to the channels 9, the matrices will be accurately sorted and each delivered to its proper channel.

As shown, the matrices are engaged with the bars 99 by the distributing screws 93, while the matrices are supported by a stop 92. As each matrix rests upon the stop 92 and 92' its projections 19, 19' and 18 or 18', as the case may be, are engaged by the distributing screws, and its toothed notch 20 is in suitable position at the end of the bar 99 to engage the ridges 100 as soon as the matrix is moved sufficiently by the rotations of the distributing screws, the stop 92 supporting each matrix until its teeth are properly engaged with the bar.

The non-type forming matrices 16 and 17, however, are not provided with a toothed notch 20, and cannot be conveniently distributed by the means just described. They are, however, as heretofore described, made longer than the matrices 14 and 15. This feature may be utilized by arranging a vertically movable cam bar 101 (see Fig. 8) in suitable bearings in the frame of my machine near the duct 42, and forming a head 102 upon the bar projecting over the duct in such a position that when a matrix 14 or 15 is positioned at the mold, the cam bar 101 will not be disturbed. Before a longer matrix 16 or 17, however, can be positioned at the mold, its upper end engages the head 102, elevates the cam bar 101 and supports the same in its elevated position until the matrix is retracted from the mold by the bar 70. When the bar is elevated, a projection 103 on the head 102 passes upward at the end of the rib 104, formed on the side of the bar 74, which continues to support the cam bar 101 after the matrix has been retracted and discharged into the terminal 82 or 83.

In the form shown, the cam bar 101 (see Fig. 8) is provided near its lower end with a slot 105. A shaft 106 is rotatably mounted in suitable bearings upon the frame of my machine and provided at one end with an arm 107, provided near its free end with a pin 108 projecting into the slot 105 and loosely embraced thereby. The stops 92 and 92' are also fixedly mounted upon the shaft 106. (See Figs. 7 and 13). The upward movement of the cam bar 101 partially rotates the shaft 106 and carries the stops 92 and 92' out of the tubes 90 and 91, leaving the same entirely clear for the reception of the matrices 16 and 17 in the parts of the tubes 90 and 91 below the stops.

The type mold may be constructed in any suitable manner or form to accomplish the desired results. As shown in the drawings, it consists of two principal elements, a base or body 109, arranged to move horizontally upon a suitable guide 110 in the frame of my machine, and a cap 111 mounted to move horizontally upon the body of the mold. The coöperating faces of these parts are formed to produce a mold cell 112 of the desired width between them, the thickness of the cell being adjustable and governed by the relative position of the cap 111 upon the body 109. As shown, the guides 113 and 114 are formed upon the ends of the cap 111, each arranged to slide longitudinally in an opening formed in the projections 115 and 116, respectively, positioned at each end of the body 109, whereby the cap is maintained in position upon the body. A spring 117 is positioned between the projection 115, and a lateral extension 118 upon the guide 113, and arranged to resiliently force the beveled shoulder 119 of the cap 111 toward the projection 115 and normally open the mold cell 112 to its greatest width. Opposing jaws 120 and 121 (see Fig. 10) are provided at the face of the mold upon the body 109 and cap 111 respectively, the jaws being suitably formed and positioned to grasp each matrix presented to the mold as the mold cell closes, thus controlling the width of the mold cell and the thickness of the type cast therein by the thickness of the matrix presented to the mold.

The relative position of the cap 111 and body 109 is preferably controlled by a wedge 122 (Figs. 2 and 10), so positioned that it may be inserted between the projection 115 and the beveled face of the shoulder 119. As shown, this wedge is positioned at the end of an arm 123 (see Fig. 2) pivotally attached to the frame 1 at 124. A spring 125 is provided, extending from the arm 123 to the frame of my machine, and tends to force the wedge 122 between the parts of the mold to close the mold cell, as above described.

Any desirable means may be employed to withdraw the wedge 122 from the mold when desired. As shown, the arm 123 is extended beyond the bearing 124 and provided with a roller 126 arranged to periodically bear upon the face of a suitably formed cam 127 upon the shaft 4, for this purpose.

The movements of the mold upon the guide 110 are preferably controlled by a cam 128 mounted upon the shaft 4, and a bell-crank 130, 132, pivotally mounted upon the frame 1 at 129. The arm 130 of this bell-crank is provided with a roller 131 arranged to bear against the face of the cam 128, while the arm 132 is suitably attached to the mold.

A spring 133 extends from the mold to a suitable point upon the frame and normally holds the mold firmly against a stop 134, which is preferably provided with an adjusting screw 135 to permit of accurately adjusting the position of the mold when in its normal or casting position shown (see Figs. 2, 7 and 9). At the proper moment the mold is moved along the ways 110 to a position where the open mold cell 112 suitably registers with an opening 136 in the frame 1. If desired, the mold may be brought into contact with a suitable portion of the frame or other stop at this point to accurately determine its position, after which the mold again returns to its normal position.

Any suitable form of metal pot may be employed for storing the type metal, keeping the same in a fluid state, and periodically forcing a portion of the metal into the mold cell to form a type. In the form shown, the pot consists of a reservoir 138 provided with a throat 139 extending from a point near the bottom of the reservoir to a nipple 140, suitably formed to accurately fit against the back face of the mold cell 112, when in casting position. A gas or oil burner 141 or other suitable means is provided for keeping the metal in the reservoir at a suitable temperature for casting.

In the preferred construction, a shell or cover 142 is formed substantially inclosing the reservoir and burner, and extending downwardly to the shaft 124, upon which it is pivotally mounted. As shown, a partition 144 extends across the reservoir above the entrance to the throat 139, provided with a well 145, having substantially vertical parallel walls fitted to receive a vertically movable plunger 146 connected by means of a rod 147 to a lever 148 which in turn is pivotally attached at 149 to suitable ears or lugs upon the pot. A port 150 is provided in the wall of the well, and so positioned as to form a suitable means of communication between the upper and lower portions of the reservoir when the plunger 146 is in its elevated position.

In the form shown, a rod 151 extends upward from a suitable projection upon the metal pot and serves as a guide for the free end of the lever 148. Adjusting means 152 are provided at the upper end of the rod 151, consisting preferably of a nut and washer. A spring 153 is arranged upon the rod, extending downward to the free end of the lever 148 to hold the same resiliently at the downward limit of its travel.

To assist in supporting the metal pot and to control its movements, two rods 154 and 155, each provided with a suitable roller 156 at its lower end, are mounted in suitable bearings upon the shell 142, and extend downward to the cams 157 and 158, respectively, mounted upon the shaft 4. Springs 159 and 159¹ are positioned upon the rods 154 and 155, respectively, each spring extending downward from a suitable lug upon the shell 142 to a shoulder upon the rods, so that as the cams rotate the face of the metal pot nipple is periodically resiliently forced against the back face of the mold cell 112.

In addition to the function above described, the rod 154 and cam 157 also control the movements of the lever 148. The upper end of the rod 154 is positioned directly beneath the lever 148, and the cam 157 is so formed that, after the metal pot has reached the limit of its upward movement and come to rest, the rod 154 continues to raise until the lever 148 reaches the upper limit of its movement. After arriving at this position and at the instant for injecting metal into the mold, an abrupt depression 160 upon the cam 157 passes under the roller 156, permitting the rod 154 and lever 148 to fall suddenly, and, by forcing the plunger 146 quickly downward in the well 145, drives a quantity of metal through the throat and nipple into the mold. When the plunger is again elevated, a portion of the metal in the upper part of the reservoir passes through the port 150 to take the place of the metal previously forced out to form a type.

As soon as the type is cast, the metal pot nipple recedes from the mold, the mold cell opens, and the mold moves to the ejecting position, as previously explained. When this position is reached, an ejector 161 (Figs. 10 and 22), mounted upon a suitable guide 162, is advanced and forces the type forward through the opening 136 into an assembling space 170. (See Fig. 22.)

The movements of the ejector are controlled by an arm 163 pivotally attached at 164 to the frame 1, and suitably attached at one end to the ejector and at the other end carrying a roller 165 arranged to bear upon the face of a suitably formed cam 166 mounted upon the shaft 4. A spring 167 is provided, extending from the arm 163 to a suitable point upon the frame 1, to resiliently maintain the roller 165 in contact with the face of the cam 166.

The type positioned in the assembling space 170 may be moved longitudinally of the space and out of the path of the next succeeding type by any suitable means. As shown, a bell crank 168, 169, is pivotally mounted upon the frame 1 at 171. The arm 168 extends vertically through the assembling space at the right of the opening 136, and the arm 169 extends horizontally into the path of a pin 172 upon the bar 43 and normally rests upon a stop 173.

At each stroke of the bar 43, the free end of the arm 168 is moved to the left in the assembling space 170, past the opening 136, and carries any type positioned in the space opposite the opening to the left.

From the foregoing, it is believed to be clearly understood how individual types, each bearing the proper letter to produce a word, may be cast and successively placed in the assembling space by the operation of the keys 3 in the order in which the letters are desired to appear in the word. It is, however, desirable that a space should occur between the several words or groups of characters forming a line. These spaces usually vary in width more or less, and are selected for each line to produce lines of unvarying length, or, as usually expressed, to produce a justified line. Before proceeding to an explanation of this portion of the machine, it should be observed that all the operations thus far described, except the discharge of the matrices from the channels 9 and the movements produced by the matrices 16 and 17, are produced by cams or other mechanism permanently connected to the shaft 4, which rotates continuously when the machine is in operation, and these movements therefore likewise occur synchronously as long as the machine is operated without regard to the operation of the keys 3. Obviously, however, it would be undesirable to have molten metal ejected from the metal pot when no type forming matrix is in position at the mold, and to avoid this inconvenience a latch 174 is provided suitably formed to engage the lever 148 when its free end is elevated, and prevent its descent. The latch 174 is pivotally attached to the melting pot at 175, and a spring 176 is provided extending from a projection 177 upon the latch to a suitable point upon the melting pot to normally hold the latch in position to engage the lever 148.

Any suitable means may be provided to release the lever 148 when a type-forming matrix is positioned at the mold. As shown, a two-part bar 178—179 extends forward from the latch 174 to the face of the mold, with its end in position to be engaged by the projection 19 upon any matrix positioned at the mold.

The part 178 of the bar is pivotally attached to the latch 174, and extends forward along the top of the metal pot to a point near the face of the nipple 140. The part 179 is attached to the mold and extends, when the mold is in its casting position, from the end of the part 178 to the face of the mold, and is there provided with a head 180 to insure proper engagement by the projection 19 of the matrices. As shown, a recess is formed in the face of the mold to receive the head 180 when pressed toward the mold. Hence, in the construction shown, the lever 148 will only be released, and the metal forced into the mold, when a matrix provided with a projection 19 is placed in casting position at the mold.

The assembling space 170 is formed between two substantially parallel and horizontal members 181 and 182, suitably spaced from each other to receive and hold a type between them in a horizontal position, the upper member 181 being finished on its top surface and preferably of substantially uniform thickness.

A vertical slot 183 is formed in the members 181 and 182 positioned to expose the central portions of each type positioned in the assembling space.

Any desired means may be employed to suitably separate the several groups of characters in a line from the adjacent groups, and justify the line. As shown, a plurality of wedges, 184, each provided with a transverse bar 185 at its thin end are suspended by means of the bar 185 upon suitable inclined ways 186—186, spaced to receive the body of the wedge between them, above the assembling space 170.

A chute 187 extends downward from the lower end of the ways 186 to the slot 183, near the opening 136, so that a wedge released from the ways 186 will be directed into the slot 183 behind the last type positioned in the assembling space, where the wedge will be supported upon the member 181 by its bar 185.

In the form shown, the wedges 184 are retained upon the ways 186 and are singly released therefrom, as required, by means of two segments 188—188, mounted upon a rotatable shaft 189, and each provided with a notch 190 of suitable size to receive a projecting end of the bar 185.

A stop 191 (Figs. 11 and 14) is provided to limit the upward movement of the segments, and a spring 192, extending from the segments to a suitable portion of the frame 1, normally holds the segments at the upper limit of their movement.

When in this position, the bar 185 of any wedge 184, supported at the end of the ways 186, will move by gravity into the notch 190, when the segments are in their normal position; when the segments are rotated downward, the wedge supported in the notch 190 is released as soon as the notches clear the end of the ways 186, the edges of the segments in the mean time preventing the wedges remaining upon the ways from escaping.

The partial rotation of the segments above described, is produced each time a space matrix, 16, released from its channel 9 by the operation of the proper key 3, is positioned at the type mold. Each space matrix 16 is provided, as before described, with an extension 22, which, as the matrix is moved horizontally to the mold, engages a pivotally supported lever 193 and partially rotates a bevel gear 194, rigidly connected to the lever, and meshing with a pinion 195 mounted upon the end of the shaft 189, thus rotating the shaft and segments.

In the manner described, that is, by casting individual type and arranging them in the assembling space with spacing wedges arranged as desired between the type so positioned, a line is finally made up of approximately but never exceeding the desired length of the finish line.

Obviously, it is of great importance to the operator to be able at all times to see exactly what portion of the line is filled, and what remains to be filled with type and spaces.

In the form of my machine shown in the drawings, the assembling space 170 is conveniently positioned for this purpose and the face of each type positioned in the assembling space is presented toward the operator and may be examined if desired.

If, however, a second indicator is desired for this purpose, it may be located at any convenient point and operated in any suitable manner.

As shown, a suitable slot is formed in the bar 43, and a roller 196 is mounted near the extremity of one arm of a bell crank 197, 198, and extending through the slot with its periphery pressed against the opposite wall of the duct 42, and in the path of the ascending matrices. The bell crank 197, 198 is pivotally attached to the frame 1 at 199, with its arm 198 connected by means of a bar 200 to one arm of a bell crank 201, 202, also pivotally mounted upon the frame 1. A spring 203 is positioned upon the frame 1 and presses against the arm 202 to resiliently maintain the parts in the position described.

A stationary graduated bar 204 is rigidly attached to the front of my machine just above the key-board, or at any other convenient point, and a longitudinally movable bar 205 is mounted in suitable bearings back of the bar 204 and attached to one end to the arm 202 of the bell crank 201, 202. The bars 204 and 205 are both provided with suitable ratchet teeth upon their upper edges, and a pointer 206, provided with suitable pawls 207 and 208, to engage said teeth, is mounted upon a bar 209 parallel with the bars 204 and 205. A spring 210 is provided to resiliently press the pointer 206 toward the stop 211 at the right, and a lever 212 is arranged upon the pointer to simultaneously detach the pawls from the ratchet teeth when desired. As each matrix is elevated through the duct, it passes between the side of the duct and the roller 196, temporarily moving the roller outward the thickness of the matrix. At each movement of the roller 196, the bar 205 is vibrated horizontally a corresponding distance, the pawl 208 engaging the teeth upon the bar 205 and moving the pointer 206 to the left while the bar 205 moves to the left, and the pawl 207 engages the teeth upon the bar 204 and prevents the return of the pointer to the right with the bar 205.

As each matrix corresponds in thickness to the thickness or set of the type cast therefrom, it is evident that the pointer 206 may, in this manner, be made to indicate exactly the aggregate set of all the type in a line, and, if desired, a bell or other alarm may be arranged to indicate to the operator when a line is nearing completion. The lever 212 is employed merely to reset the pointer 206 at the completion of each line. When a line is completely assembled, the line key is operated, and the line moved from the assembling space to the justifying space, which is merely a continuation of the members 181 and 182 to the left, with the space 170 and slot 183, as heretofore described. The assembled line is moved from the assembling to the justifying position in the space 170 by means of a horizontally movable carriage 213 mounted upon a suitable way or guide 214, and provided with a bar 215 arranged to slide longitudinally upon the carriage, and so positioned that, when desired, one end may be inserted in the slot 170. The movements of the carriage 213 are controlled by a bell-crank 216, 217, pivotally mounted upon the frame 1 at 218, the arm 216 being attached in any suitable manner to the carriage, and the arm 217 provided with a fixed pin positioned in a slot 219 in a bar 220, vertically movable in suitable bearings 221—221¹ upon the frame 1. A roller 222 is mounted at the end of the bar 220 to bear against the face of a cam 223 carried by a shaft 225, rotatably mounted in suitable bearings upon the frame, a spring 224 being provided extending from the arm 216 to a suitable portion of the frame 1, to resiliently force the arm 216 to the right and the roller 222 against the face of the cam 223. The shaft 225 is preferably rotated by means of two gears 227 and 228, mounted respectively upon the shafts 225 and 4, as shown. The gear 227 is rigidly mounted upon the shaft 225, while the gear 228 is loosely mounted upon the shaft 4 and provided with suitably formed clutch jaws upon one end of its hub, and the usual or any suitable means for preventing longitudinal movement of the gear upon the shaft.

A sleeve 229 is mounted upon the shaft 4 and provided with jaws at one end adapted to coöperate with the jaws upon the hub of the gear 228, the sleeve being loosely attached to the shaft by a feather or equivalent means to prevent rotation between them, while leaving the sleeve free to be moved longitudinally as desired. Any suitable means may be employed to move the sleeve 228 longitudinally of the shaft 4. As shown, a concentric groove 36 is formed in the sleeve 229, and a shifter 230 is provided with means for engaging the groove. The shifter may be of any suitable form, and, as shown, is rigidly attached to one end of a shaft 231, rotatably mounted in a suitable bearing 232 upon the frame 1.

Two collars are provided at the opposite end of the shaft 231, a fixed collar 233 provided with a lug 234 (see Fig. 31) and a loose collar 235 provided with a lug 236, so arranged that when the collar 235 is rotated in one direction, it will engage the lug 234, rotate the shaft 231 and shift the sleeve 229 along the shaft until the jaws upon the sleeve engage the jaws upon the gear 228, thus locking the gear rotatively with the shaft.

The above described operation is produced by the operation of a line key. This key when depressed releases a line matrix 17 from its storage channel 9, which matrix is presented to the type mold and then returned to its storage channel as heretofore explained. As the line matrix 17 is moved horizontally to the type mold, its projection 23 engages a lever 237 (Figs. 11 and 35), mounted upon a vertical shaft 238, and partially rotates the same. The shaft 238 is mounted in suitable bearings 239—239¹, and at its lower end carries a latch or lug 240 normally positioned above a similarly shaped part 241 upon a vertically movable shaft or rod 242 (Figs. 5 and 19). An arm 243 is also mounted upon the shaft 238, and a spring-actuated catch 244 is positioned in the path of the arm 243 to engage its free end, and, when the shaft 238 is partially rotated, as above described, prevent the return of the parts to their normal position when the matrix 17 is removed from the mold. A spring 245 is provided, extending from the arm 243 to an adjacent portion of the machine, to resiliently maintain the shaft 238 and its associated parts in its normal position. The shaft 242 is pivotally attached at its lower end to a projection 246 upon the collar 235, and a spring 247 is provided to resiliently force the shaft 242 upward and thus rotate the collar 235 and the shaft 231, as soon as the shaft 242 is released from the latch 240 (see Fig. 31). The rotation of the shaft 225 causes the carriage 213 first to move to the right until the bar 215 is beyond the right hand end of the assembled line in the space 170, when the bar 215 is advanced into the space 170 at the end of the line, and the carriage 213 with the bar 215 in that position is moved to the left until the left hand end of the assembled line reaches the bar 215¹, mounted upon a fixed carriage 213¹. The carriage 213¹ and its bar 215¹ are substantially the same in general construction and operation as the carriage 213 and bar 215, except that the longitudinal position of the carriage 213¹ upon the way 214 is practically fixed, being only adjustable a short distance by means of the micrometer screw 248 to accurately gage the length of the lines. The longitudinal movements of the bars 215 and 215¹ may be produced by any desired mechanism.

As shown, arms 249, 249¹, are slidably mounted upon a shaft 250 (see Fig. 24), but prevented from rotation upon the same by means of a suitable feather and spline or equivalent means, the parts 251, 251¹ of each carriage extending to the shaft at each side of the arm to keep the same in proper relation to the carriage. The free end of the arm 249 is attached to the bar 215 in any suitable manner, so that a partial rotation of the shaft will cause the desired movement of the bar. An arm 252 is fixed near one end of the shaft 250, and connected by means of a link 253 (see Fig. 22) to the arm 254 of a bell-crank, 254, 255, the arm 255 being provided with a collar 256 to bear upon the face of a cam 257 mounted upon the shaft 225, the weight of the parts, assisted by a spring 37, being arranged to maintain the roller in suitable contact with the cam face.

As the bar 215 is moved toward the space 170, a lug 258 upon the bar, having preferably one beveled and one square face, is moved into position to engage the projection 259 upon any of the line dogs 260 which are in engaging position. (See Figs. 24, 30). The dogs 260 are merely distance pieces of any suitable thickness, rotatably mounted upon a fixed shaft 261, each dog being provided with a projection 259 and a tail or handle 262, stops 263 and 264 being so positioned that, with the handle 262 of any of the dogs resting against either, it will be retained in that position by gravity, and with the handle of any dog resting against the stop 263 that dog is out of its engaging position; that is, its projection 259 is out of the path of the lug 258; but, with its handle turned up and resting against the stop 264, it is in its engaging position, or its projection 259 is positioned in the path of the lug 258. Thus, while the carriage 213 is free to move to the left with the bar 215 extending into the space 170, it cannot move to the right past any dog 260 in engaging position; the line of type moved to the left by the carriage 213, being thus positioned between the two substantially fixed bars 215, 215¹, and the distance between the bars determined by the position of one of the dogs 260. As the assembled line is moved from the assembling to the justifying position, the depending end of the first wedge 184 at the left hand end of the line, engages a finger 265, and moves it to the left also. (Figs. 3, 11 and 31).

The finger 265 is pivotally mounted upon the frame 1 at 266 and connected by means of a rod 267 to a second projection 268 upon the collar 235, and as the free end of the finger 265 is moved to the left, the collar 235 is partially rotated, compressing the spring 247 and revolving the lug 236 away from the lug 234, thus freeing the shaft 231 entirely from the control of the spring 247.

A second gear 269 is loosely mounted upon the shaft 4, at the opposite end of the sleeve 229, with jaws formed upon its hub similar to those upon the hub of the gear 228, the end of the sleeve 229 adjacent the hub of this gear being also provided with jaws adapted to coöperate therewith to rotate the gear.

A lug 270 is provided upon the side of the gear 228, and a projection 271 is positioned upon the shifter 230 in the path of the lug 270, so that as soon as the line is moved to the justifying position, as above described, the lug 270 engages the projection 271 and moves the shifter 230, forcing the jaws upon the sleeve 229 out of engagement with the jaws upon the hub of the gear 228, and the jaws at the opposite end of the sheave 229 into engagement with the jaws on the hub of the gear 269, thus stopping the shaft 225 and starting a shaft 275 rotatably mounted in suitable bearings on the frame by means of a gear 272 upon the shaft 275, meshing with the gear 269 upon the shaft 4.

The first operation caused by the rotation of the shaft 275 is the movement of a space mold 273 to the right, to its casting position (see Figs. 3, 4 and 12). The space mold (see Fig. 15) consists of a body 274 corresponding in width to the length of the space desired, and having an opening 276, which extends transversely therethrough. A slide 277 is fitted in the opening, with a stem 278 extending longitudinally of the body beyond its end, and a spring 279 is provided to normally hold the slide 277 at the end of the opening, so that the mold space or opening 280 is open to its widest capacity.

Suitable means are provided for mounting the mold 273 upon a suitable horizontal guide 281, extending parallel to the space 170, and so arranged that the front side of the mold space is positioned at the same height and in close proximity to the foot ends of the type contained in the space 170, and, when the mold is in its casting position, its front surface is in contact with a stationary block 304, closing the front of the mold opening 280, and the stem 278 is pressed inward by coming into contact with the wedge-shaped bar 292, which is hereafter described.

The movements of the mold 273 are controlled by a bell-crank 282, 283, the arm 282 of which is attached in any suitable manner to the mold. Its arm 283 is provided with a pin or roller 284, positioned in a slot 285 formed in a vertically movable bar 286, mounted in a suitable bearing 287 upon the frame 1. A roller 288 is mounted at the upper end of the bar 286, and arranged to bear upon the face of a suitably formed cam 289, mounted upon the shaft 275. If desired the mold 273 may be brought up against a suitable stop when it arrives at its casting position and locked from horizontal movement, so that its position cannot vary through looseness of the joints or spring of the parts of the operating mechanism.

As soon as the mold arrives at its casting position, a vertically movable slide 290, mounted in a suitable guide or bearing 291 and positioned below the assembled line, is raised, forcing the space wedges 184 in the line upward through the line, and thus increasing its length until it completely fills the space between the bars 215 and 215¹. At the same time the vertically movable wedge-shaped bar 292, mounted in a suitable bearing 293 (see Figs. 11 and 12), and against which the stem 278 of the mold slide 277 is forced, descends, permitting the mold space 280 to gradually open and thus correspond in width exactly at all times to the space between the type occupied by each wedge 184.

Any desired means may be employed to operate the slide 290 and bar 292. As shown, a lever 294 is pivotally mounted upon the frame 1 at 295, with one end connected to the slide 290 at 296, and the other end similarly connected to the bar 292 at 297, thus transmitting motion from the bar to the slide and positively maintaining the relative position of each. The arm 298 of a bell crank 298, 299 is suitably attached to the bar 292, and the arm 299 is provided with a roller 301 arranged to bear upon the face of a cam 302, upon the shaft 275; a spring 303 being provided extending from the arm 298 to a suitable portion of the machine, resiliently tending to maintain the bar at its lowest position and the roller 301 in suitable contact with the face of the cam.

As soon as the mold 273 is adjusted, as above described, a metal pot 300 is advanced, and the face of its nipple 305 is positioned against the rear face of the mold and a portion of the contents of the pot is discharged into the mold space to form a space.

Any suitable form of metal pot may be provided. That shown in the drawings (see Figs. 23 and 25) consists of a reservoir 306 provided with a jacket or housing 307, the whole being pivotally mounted upon the frame 1 at 308 by means of suitably formed arms or brackets 309. The nipple 305 projects from the lower front side of the jacket and is connected to the reservoir 306 by the passages 310 and 311 and the cylinder 312. A choker or valve 313 is positioned in the passage 310 and controls the discharge of metal from the reservoir. The passage 310 extends from the nipple 305 to the cylinder 312 and is preferably circular in cross-section, the passage 311 extending upward therefrom at a point near the cylinder. The valve or choker 313 is formed to snugly fit within the passage 310, and is provided with a suitably formed point 314 to fit in and close the nipple, and a duct 315 extended longitudinally of the choker and terminating at the front in the openings 316 and 316¹. The point 314 of the choker is formed to project slightly beyond the face of the nipple when closed, so that when a type is cast this point projects slightly into the foot of the type forming a slight cavity thus making it unnecessary to finish or dress the foot of the type.

The choker 313 is preferably so formed that when in position closing the nipple 305, the passage 310 and duct 315 are open to the passage 311, and metal is free to pass from the reservoir by way of the passages 311 and 310 into the lower portion of the cylinder 312, but when the choker is retracted to open the nipple, communication between the passages 311 and 310 is cut off.

The movements of the choker 313 are preferably controlled by a bell crank 317, 318, pivotally attached to the top of the pot at 319. The arm 317 extends downward through the reservoir 306 into the passage 311, where it is suitably formed to engage an annular recess or equivalent means upon the choker 313, the arm 318 extending to the rear where it is attached to a rod 320 extending downward, and at its lower end provided with a suitable roller 321 to bear upon the face of a cam 322 mounted upon the shaft 275. A suitable spring 323 is provided to resiliently force the rod 320 downward, thus normally holding the choker 313 in position to close the nipple 305.

The cylinder 312 is fitted with a plunger 324, attached by means of a rod 325 to a lever 326, pivotally attached to the pot 300, at 327, and extending backward to a suitable rod 328. A spring 329 is provided upon the guide rod 328 to resiliently force the end of the lever downward, and suitable adjusting means 330, preferably a nut and washer, are provided to control the pressure of the spring upon the lever.

A vertically movable rod 331 is arranged in suitable bearings at the rear of the pot, with its upper end arranged to engage the lever 326 to elevate the same, and its lower end provided with a roller 332 adapted to bear upon the face of a cam 333 mounted upon the shaft 275, a spring 334 being provided upon the rod to resiliently force the same downward upon the cam.

An abrupt shoulder or depression 333¹ is formed in the face of the cam 333, so that after the free end of the lever 326 and plunger 324 are elevated, the roller 332 drops into the depression 333¹ and the spring 329 forces the parts quickly downward; at the same instant, the choker 313 is retracted from the nipple and the metal in the cylinder is forced through the passage in the choker and into the mold. A third vertically movable rod 335 is positioned in suitable bearings at the rear of the pot 300, provided with a spring 336 resiliently forcing the same downward, and a roller at its lower end arranged to bear upon the face of a cam 337 upon the shaft 275. This latter rod and its associated parts is provided to primarily control the movements of the metal pot 306, although it is evident that the rods 320, 331, springs 323, 334, and cams 322, 333, may be arranged to materially assist in this operation, insuring a very firm and even pressure of the nipple face against the mold.

Any suitable heating means may be employed to maintain the metal in the pot 300 at a suitable temperature. As shown, a simple form of gas or oil burner 338 is arranged below the reservoir and connected by a suitable tube 339 to a tank or other convenient source of supply (not shown). A carriage 340 is also mounted upon the guide 281, and arranged to move horizontally parallel to the space 170, its movements being controlled by an arm 341 pivotally mounted upon the frame 1 at 342, and connected by means of the spring 343 to the arm 282, so that the mold 273 and the carriage 340 are normally held in contact. When the mold is carried to the right to its casting position, the carriage 340 also moves to the right, until the parts 344 and 345 (Fig. 11) of the carriage, carried just above and below the members 181 and 182, respectively, engage a space wedge 184 and prevent its further movement. When in this position, the forked extremity 346 of an arm 347 pivotally mounted upon the carriage 340 at 348, is positioned astride the first wedge 184, and below its bar 185 (see Fig. 26). As soon as a space is cast in the mold 273, the metal pot 300, slide 290 and bar 292, return to their normal positions, the mold opens and is moved to the left by the spring 343 until it meets the carriage 340, the carriage and mold being so formed that when in this position the mold space 280 is directly in line with the gap between the type containing the wedge 184, which arrested the movement of the carriage 340, and an ejector 349 mounted upon the carriage.

Any suitable means may be employed to withdraw the wedge 184 and insert the space carried in the mold 273 in its place. As shown, a threaded sleeve 350 is rotatably mounted upon the shaft 261 to control the positions of the dogs 260 upon the shaft, and provided with a lug 351. A rod 352 connects the lug 351 to the arm 353 of the bell crank 353, 354, mounted upon the frame 1 at 355. The arm 354 is preferably provided with a suitable roller 356 arranged to bear upon the face of a cam 357 mounted upon the shaft 275; a spring 358 being provided to resiliently maintain the roller 356 and associated parts in suitable relation to the same. When the parts have arrived in the position above described, the threaded sleeve 350 is partially rotated, permitting the dogs 260 to move to the right and thus increasing the space between the bars 215, 215$^1$, confining the line of type. At the same time the forked end of the arm 347 is raised, engaging the wedge 184 and carrying it upward clear of the type, considerably increasing the length of the line by increasing the gap in the line occupied by that particular wedge as its butt or large end passes through the space.

The movements of the arm 347 are preferably controlled by a splined shaft 360 supported in suitable bearings 359—359$^1$ parallel to the guide 281. A crank 361 is fixed upon the end of the shaft 360 and suitably connected to the arm 362 of the bell crank 362, 363, mounted upon the frame 1 at 364 and carrying a roller 365 at the extremity of the arm 363 to operate upon the face of a cam 366 mounted upon the shaft 275. The carriage 340 is provided with a bearing upon the shaft 360, and a crank 367 is attached to the carriage and mounted upon the shaft and provided with a feather or equivalent means to engage the spline, so that while the crank 367 is free to move longitudinally of the shaft 360 with the carriage, its position is at all points controlled by the shaft. A rod 368 is suitably attached at one end to the free end of the arm 367 and at its opposite end to a crank 369 rigidly connected to the arm 347.

The ejector 349 is arranged to move horizontally in suitable ways 370 upon the carriage 340, its movements being controlled by an arm 371 suitably connected at its end with the ejector at 372 and mounted upon the shaft 360 with a suitable feather provided to engage the spline formed in the shaft, so that the arm 371 is free to move longitudinally of the shaft 360, which by its position at all times controls the position of the ejector. As the arm 347 raises the wedge 184, the ejector is advanced and forces the space out of the mold into the enlarged gap in the line previously occupied by the wedge, after which the ejector is withdrawn, and the sleeve 350 is turned back to its normal position upon the shaft 261. The arm 347, after delivering the wedge 184 to the carrier 373, is lowered to its normal position, and the mold is again moved to the casting position and the operation of forcing the remaining wedges in the line upward to space the line, casting a space in the mold, transferring the mold to its place opposite the next gap in the line, releasing the line, removing the wedge and inserting the space, is repeated as above described for each space wedge in the line.

The carrier 373, in the form shown, consists of two substantially U-shaped hooks, connected at their upper arms and attached to a horizontally movable bar 374 positioned substantially parallel to the space 170 in guides 375, and in suitable relation to the ways 186 so that the lower arms of the carrier 373 may be brought into contact with the upper end of the ways when the carrier is at the limit of its movement toward the ways, but arranged to travel in the opposite direction far enough for the carrier 373 to remove a space wedge from the forked end 346 of the arm 347, when the carriage 340 is at the extreme left-hand end of the line of type in the justifying position in the space 170.

The movements of the bar 374 may be produced in any desired manner. As shown, a vertical shaft 376 is mounted in suitable bearings 377—377$^1$, and provided at its upper end with an arm 378 with its free end attached in any suitable manner to the bar 374 at 379. An arm 380 is fixed to the shaft 376 near its lower end, and provided with a roller 381 arranged to bear upon the face of a cam 382 mounted upon the shaft 275, a spring 383 being provided extending from the free end of an arm 384, mounted upon the shaft 376, to a suitable part of the frame 1, to resiliently maintain the parts in suitable relation to the cam.

The movements of the arm 347 and carrier 373 are so timed that the forked end 346 is elevated and held in its elevated position while the carrier 373 passes it, moving toward the ways 186, the carrier 373 being preferably pivotally attached to the bar 374 and having a spring 387 arranged to normally hold the carrier in the position shown, so that when the carrier comes in contact with the ends of the ways 186, it may tilt upward and discharge the wedge onto the ways.

As each wedge 184 is removed, the free end of the finger 265 moves to the left and engages the next wedge in the line until the last wedge is removed, when the finger moves to the left until the clutch sleeve 229 is disengaged from the gear 269, allowing the shaft 275 to stop and reëngage with the gear 228 rotating the shaft 225.

The first operation produced by the movement of the shaft 225 is a partial rotation of the shaft 250, withdrawing the ends of the bars 215—215¹ from their position in the space 170 at the ends of the now finished line, and moving the lug 258 of the bar 215 horizontally from engagement with any of the dogs 260; the next is the movement of the carriage 213 to the right, to its normal position at the right of any type being assembled in the space 170. As it moves to this position, the arm 216 engages a projecting part 413 upon the spring catch 244, and throws the catch out of engagement with the arm 243. (See Fig. 20). The next movement is caused by a cam 388 upon the end of the shaft 225 engaging first with its face 389 a pin 390 upon the bar 286 forcing the bar downward and carrying the mold 273 and carriage 340 to the right until a spring catch 391 upon the carriage is beyond the right hand end of the line, when the face 392 upon the cam 388 engages the pin 390 and elevates the bar 286, forcing the carriage to the left, when the catch 391 engages the line of type and carries it to the left into a space 393 immediately above and separated from the galley 394 only by the plates 395—395¹, the face of the catch 391 stopping even with the right hand inner face of the galley. A line depressor 396, extending the full width of the galley, is arranged above the space 393 and provided with a shank or stem 397 extending upward through an opening in the frame of the machine, and also an elongated opening 398 formed in a horizontally movable bar 399. A spring 400 is provided to resiliently force the line depressor downward, and a projection 401 is provided upon the shank 397 to engage the bar 399, and normally prevent such downward movement. Bell cranks 402 and 403 are mounted upon the frame 1 at 401, 405, respectively, with one arm of each attached to the line depressor 396 at 406, and their other arms attached, respectively, to the plates 395 and 395¹. A spring 407 is provided to normally hold the bar 399 in position to engage the projection 401, and a lever 408, pivotally attached to the frame 1 at 409, is attached to the end of the bar 399, with its opposite end extending downward and provided with a screw threaded stop 410, the end of which is positioned in the space 393 slightly to the right of the left-hand edge of the galley 394.

In case the justified line of type is not of sufficient length to extend entirely across the galley, as in some kinds of tabulated matter where it is desirable to assemble the lines in short, independently justified sections, the type transferred to the space 393 merely rests upon the plates 395—395¹ until the final section to complete the line is transferred to the space 393. When this occurs, the left-hand end of the complete line engages the stop 410, pressing it outward to the inner left-hand edge of the galley. This movement carries the bar 399 out of engagement with the projection 401 and allows the line depressor to descend, withdrawing the plates 395—395¹ from beneath the line of type, which is then pressed downward into the galley by the face of the line depressor 396, all the type previously positioned in the galley and supported by the spring clip 411, or equivalent means, being forced downward the thickness of a line of type by this depressor as each line enters the galley. As soon as the parts have moved to position the line in the galley, a lug 412 upon the gear 228 engages the projection 271 upon the shifter 230, moving the same to disengage the clutch sheave 229 from the gear 228, and also carrying the shaft 242 downward to a position where the latch 240 released from the catch 244 by the movement of the arm 216 can again engage the part 241 and lock the shaft 242 in its depressed position, thus stopping the operation of this portion of the machine with the line depressor resting upon the type just positioned in the galley.

An arm 414 is provided upon the bell crank 403, and provided with a pin 415 positioned in a slot 416 in a bar 417. A crank 418 is mounted upon the shaft 250, with one end of the bar 417 attached to its free end. When the shaft 250 is partially rotated, the arm 414 is drawn downward, returning the line depressor and associated parts to their normal position.

In the foregoing description where the terms "up and down," "right and left hand," are used, it should be understood as merely referring to the form of my device shown in the drawings, and that in many cases, at least, a machine could be constructed in which these directions are greatly modified or even reversed, without departing from the spirit of my invention, and which would operate quite as satisfactorily, it being understood that this description merely is intended to clearly explain a preferred form of my device, and that various immaterial modifications may be made from my device, as shown and described, without departing from the sprit of my invention.

Where in the claims I refer to "composing matrices" or to "assembling matrices", I desire to be understood as meaning releasing matrices from their several channels and presenting them singly to the mold in the order in which they were released.

While two forms of melting pots are shown in the drawings, it is apparent that both may be of identical construction, if preferred.

By employing one mold for casting character-bearing type and a separate mold for casting the spaces between the words, I am enabled to produce "low" spaces, or, in other words, spaces the length of which will be enough below "type height" to preclude the possibility of their receiving ink in the process of printing and showing in the print.

While in the preferred form of my device as shown, matrices are presented singly to the mold and a single type-character cast therefrom, in some instances it may be desirable to employ combination matrices and cast logotypes, or several characters at each operation. Wherever in the specification and claims I refer to single type, I wish the language to be understood as embracing characters of this nature.

By employing devices for releasing the matrices from their magazines immediately casting a type from each as released and at once returning them to their appropriate magazines, the matrices pursuing a circulatory course in the machine, I am enabled to reassemble the same matrix and again employ it in the same line, thus greatly reducing the number of duplications of each matrix.

By passing the matrices in a circulatory course the speed of composition is not retarded, as is the case in machines wherein the matrices have a reciprocating movement and in which each matrix after use must be returned to its starting point before another matrix can be released.

While I prefer to employ the form of character bearing matrices herein shown and described, I do not wish to be understood as limiting myself to their employment. Any form of matrix may be used, provided only that it be made to conform to the requirements of my apparatus.

Having thus described my invention, I claim as new and desire to secure by Letters Patent:—

1. In a composing machine, type casting mechanism, controlled by a plurality of matrices of similar form, and a justifying mechanism controlled by a plurality of matrices of another form, and means for controlling said mechanisms by said matrices whereby one form of said matrices is adapted to cause the operation of said type casting mechanism and the other form of said matrices is adapted to prevent the operation of said type casting mechanism.

2. In a composing machine provided with matrices of varying form, means for producing justified lines of individual type comprising matrix releasing and distributing mechanism, means controlled by one form of said matrices for casting type therefrom, and mechanism controlled by another form of said matrices for justifying said type into lines of definite length.

3. In a composing machine, automatic self-adjusting mechanism for casting justifying spaces of varying widths, a series of non-type forming matrices controlling said mechanism, a series of type forming matrices, and a separate type casting mechanism for casting type from said series of type forming matrices.

4. In a composing machine, means for controlling the movements of a plurality of disconnected circulatory matrices, a magazine for said matrices, an automatic casting mechanism adapted to cast individual type from said matrices, comprising mechanism whereby the matrices pursue a circulatory course and are available for use more than once in the same line, and a separate space forming and line justifying mechanism.

5. In an apparatus for producing justified lines of type, the combination of type forming and non-type forming matrices and type forming and space forming mechanism, the type forming matrices controlling the type forming mechanism and the space forming matrices controlling the space forming mechanism, and means for first forming all the characters and thereafter all the spaces in a line of type.

6. In a typographic machine provided with a plurality of character bearing matrices and a plurality of non-character bearing matrices, type casting mechanism, and means for storing said matrices, in combination with means for individually releasing said matrices, means operated by said character bearing matrices for starting the operation of said casting mechanism, and means adapted to coöperate with said non-character bearing matrices for preventing the operation of said casting mechanism.

7. A typographic machine provided with character matrices and space matrices, comprising means for storing said matrices and individually and selectively releasing the same, in combination with mechanism for casting type from said character matrices, means for thereafter assembling said type into lines, and mechanism controlled by said space matrices for justifying said lines, comprising means for inserting justifying spaces between the groups of characters in the line after all the character type have been cast.

8. In a machine for casting and composing individual type means for selecting matrices whose thickness determines the "set" width of the types subsequently cast therefrom, mechanism for casting type therefrom and assembling them in line with expansible temporary spacers between the words thereof, the expansion of said spacers determining the size of permanent spaces which will exactly justify said line.

9. In an apparatus of the kind described for producing lines of single types and spaces, a plurality of matrices, means for storing said matrices, a type mold, means for selecting said matrices as desired and presenting the same singly to said type mold and casting a type therefrom, in combination with means for returning said matrices to their respective storage chambers, assembling said type into lines and thereafter justifying said lines to fill a predetermined measure.

10. In a machine for casting and composing individual type, a plurality of independent matrices each bearing a plurality of characters, means for storing said matrices, a type mold, means for selectively presenting said matrices to said mold with the desired character thereon in position to coöperate with the mold cell to form a type, and means for casting a single type from said matrix, in combination with means for returning said matrix to its storage chamber, removing said type from the mold, and assembling the same with similar type into a line.

11. In a machine for casting individual type, a series of independently movable matrices whose thickness determines the adjustment of the mold, a mold, means for selectively presenting the matrices at varying levels to said mold and adjusting the set width thereof, in combination with casting mechanism, and means operated by said matrices for controlling said casting mechanism.

12. In a machine for casting individual type, a series of independently movable matrices having one or more characters on the edge thereof, a type mold and means for presenting said matrices edgewise to said mold and adjusting the mold by the engagement of the mold members with the opposite sides of the matrix, in combination with a casting mechanism and means brought into action by the matrix so presented to the mold for casting a single type from said matrix.

13. In a machine of the kind described, a plurality of type forming and non-type forming matrices, a mold and means for selectively presenting any of said matrices to said mold, casting a type from each type forming matrix so presented and assembling said type into a line, in combination with means controlled by the movement of a non-type forming matrix for releasing said line and moving the same from the assembling point.

14. In a machine for casting and composing individual type, a plurality of type forming, and non-type forming matrices, a type mold, means for selectively presenting any of said matrices to said mold, casting a type from each type forming matrix so presented and assembling said type into line, in combination with means controlled by the movement of a non-type forming matrix for operating a temporary spacer inserting mechanism.

15. In a machine for casting and composing individual type, a plurality of type forming and non-type forming matrices, a type mold, means for selectively presenting any of said matrices to said mold, casting a type from each type forming matrix so presented, and assembling said type into line, in combination with means controlled by the movement of a non-type forming matrix for inserting temporary spacers in the line and subsequently casting justifying spaces and inserting the same in said line.

16. In a typographic machine adapted to operate with matrices of various thicknesses, a type mold adapted to automatically adjust itself by engaging the opposite sides of the matrices for casting all of the character bearing types from said matrices, in combination with an adjustable space mold for casting the justifying spaces.

17. In a typographic machine adapted to operate with character representing devices and space representing devices, means for casting type from said character representing devices without first assembling said devices in a line, means for assembling the cast type in a line, means controlled by said space representing devices for justifying said line of type after all of the character bearing type have been cast, and means for removing said justifying means one by one from the line.

18. A typographic machine adapted to operate with a series of matrices of varying thicknesses comprising an adjustable type mold adapted to automatically adjust itself to any of said matrices, means for presenting said matrices to said mold, means for casting type therefrom, and means for thereafter assembling said type into lines with justifiers between the several words in the line.

19. In a machine for casting individual type an adjustable type mold, a plurality of matrices each having a character upon one edge thereof, the thickness of said matrix corresponding to the width of the character thereon, a magazine for storing said matrices, and means for selectively and separately presenting said matrices to said mold and adjusting the mold to conform to the thickness of the matrix, in combination with means for casting a single type from each matrix so presented, means for returning said matrix to its magazine, and means for ejecting the type as formed from the mold.

20. In a type casting and composing machine, a type mold, an assembling device for arranging the type in line as they are delivered from the mold with temporary wedge shaped spacers between the words, in combination with means for transferring each line as assembled to a justifying position and there justifying said line by casting and inserting justifying spaces between the several words or groups of characters in the line.

21. In a typographic machine provided with a plurality of type forming matrices and a plurality of non-type forming matrices, a matrix assembling, a type casting, and a justifying means, in combination with means for continuously operating the type casting mechanism, and means controlled by the non-type forming matrices for intermittently operating the justifying mechanism.

22. In a typographic machine provided with a plurality of matrices, a plurality of temporary justifiers and means for casting individual type from said matrices, in combination with means for assembling a plurality of said type in a line, means for introducing said temporary justifiers into said line as desired, means for expanding said line by changing the position of said justifiers in the line and means for forming permanent spaces and replacing all said temporary justifiers by said permanent spaces.

23. In a typographic machine provided with a plurality of type forming and non-type forming matrices and temporary wedge-shaped spacers, means controlled by said matrices for forming a line of individual type, means for automatically placing said spacers in said line, a mold controlled by said wedge-shaped spacers and means for casting permanent justifying spaces therein, in combination with means for successively replacing all said temporary spacers in the line with said permanent spaces.

24. In a typographic machine provided with type forming and non-type forming matrices, a plurality of temporary wedge-shaped justifiers and means controlled by the non-type forming matrices for automatically placing said justifiers in a line of individual type as desired, in combination with means for expanding said line by changing the position of said justifiers in the line, and means for successively casting and replacing all of said temporary justifiers in the line by permanent spaces.

25. In a matrix composing and type casting machine, a plurality of series of matrices and a plurality of magazines for said matrices, a separate magazine being provided for each series, in combination with matrix releasing and matrix distributing means for each magazine and means for returning said matrices to said magazines in the order of their discharge.

26. In a matrix composing and type casting machine, a plurality of matrix magazines, in combination with matrix releasing means for each magazine, and a single set of operating keys or levers common to the several releasing means, and a vertically movable plate controlling the connections between said keys and said releasing means.

27. In combination with matrix magazines arranged in groups or series, one group behind another, a series of race plates also arranged one behind another and converging toward a common receiver, a plurality of series of matrices, and means for discharging matrices into said receiver and means for removing then singly therefrom and returning them to their appropriate magazines in the order of their discharge.

28. In a composing and distributing machine, a plurality of matrix magazines and a distributer for each magazine, in combination with a plurality of series of matrices, means for assembling said matrices and casting individual type therefrom, and thereafter individually directing each matrix of any series to its appropriate distributer.

29. In the composing and distributing mechanism of a type casting machine, the combination of a series of matrix magazines, a distributer for each magazine, a plurality of series of matrices, a common path for all the matrices, a movable stop positioned in said path, and means for moving the stop and directing the path of each matrix to its distributer.

30. In a matrix composing and distributing machine, a plurality of magazines, an individual distributing mechanism for each magazine, a plurality of series of matrices, and means for directing each matrix to its appropriate distributing mechanism in the same order in which it was composed.

31. In a typographic machine, means for first casting all the character bearing units in a line of type, and thereafter successively casting the justifying spaces and inserting them between the words, the casting of both characters and spaces being controlled by independently movable matrices.

32. A typographic machine, comprising a plurality of matrices and magazines therefor, an overlying distributer for each magazine, a matrix releasing and a type casting mechanism, means for presenting each matrix to said casting mechanism as soon as released from said magazine, casting individual type therefrom, and means for returning said matrices to the opposite end of the magazine from which they were released, whereby the assembling, casting, and distributing operations for the same line are carried on concurrently.

33. A typographic machine provided with matrices, magazines for storing said matrices, means for selectively releasing said matrices from one end of said magazines, means for casting type from said matrices and thereafter returning each matrix to the opposite end of its particular magazine before the composition of the line is completed, whereby any of said matrices may be used more than once in the same line.

34. In a typographic machine provided with a plurality of free matrices, upright magazines for storing said matrices, means for selectively releasing said matrices from the lower ends of said magazines, mechanism for casting type from said matrices, and means for thereafter returning each matrix to the upper end of its particular magazine before the composition of the line is completed whereby any of said matrices may be used more than once in the same line.

35. In a machine of the class described, provided with a plurality of matrices each with duplicate characters thereon, storage receptacles for said matrices, means for releasing a matrix from the lower end of its storage receptacle, presenting either of its characters to a type mold, means for casting an individual type therefrom, means for returning said matrix to the upper end of its storage receptacle, and thereafter justifying the type into lines of predetermined length.

36. In a machine of the kind described, a plurality of series of matrices, each adapted to form a plurality of type faces, a separate magazine for each series, and an independent distributer for each magazine, in combination with means for separately and selectively presenting said matrices to a casting apparatus, and means for subsequently placing each matrix directly in its own distributer.

37. In a typographic machine, a plurality of matrices, a plurality of vertical magazines for storing said matrices, means for discharging said matrices from said magazines and directing them to a common point, and means for restoring said matrices to said magazines in the order of their discharge.

38. In a typographic machine, a plurality of series of matrices each provided with duplicate faces, a plurality of magazines each adapted to contain a series of said matrices, a casting mechanism and a distributing mechanism, in combination with means for selectively assembling said matrices at varying levels at a common point, presenting the same successively at varying elevations to the casting mechanism, and means for subsequently directing each matrix to its appropriate distributing mechanism, said directing means being controlled by the various matrices.

39. In a typographic machine, a plurality of series of circulatory matrices, a plurality of magazines for storing said matrices and a type casting mechanism, in combination with means for releasing said matrices from the magazines and conveying them one at a time to said casting mechanism, and means for controlling the subsequent path of said matrices.

40. In a machine for producing lines of individual type, a plurality of magazines, a series of matrices for each magazine, means for releasing said matrices from either magazine as desired, and means for casting an individual type from each matrix, in combination with means for indicating the path of said matrices to their distributers prior to their discharge from the casting mechanism, and means for directing said matrices along said path.

41. In a matrix distributing mechanism a plurality of distributers, a movable guide for directing matrices one by one to said distributers and means controlled by the matrices for moving said guide.

42. In a machine of the kind described, a plurality of matrices, and a plurality of magazines for storing said matrices, in combination with a separate distributer for each magazine, means for releasing matrices one by one from said magazines, casting a single type from each and delivering said matrices one by one to the distributing mechanism in the order of their release.

43. In a machine of the kind described, a plurality of series of matrices, a plurality of magazines each adapted to contain a series of said matrices, and a separate and distinct matrix distributer for each magazine, in combination with means for controlling the path of said matrices to deliver the same to their respective distributers.

44. In a machine of the kind described, the combination of a distributer bar and carrier screws for advancing matrices along said bar, a horizontal guide, and a downwardly extending guide arranged to deliver said matrices directly between the threads of said carrier screws.

45. The combination of a font of matrices or dies, bearing in part duplicate characters and in part varying characters, a type mold, and means for forwarding and presenting each matrix as composed in such position before the mold as will cause a single type from the selected character to be cast.

46. A composing machine, comprising means for selectively releasing matrices whose thickness coincides with the width of the type subsequently cast therefrom, an adjustable type mold controlled by said matrices, means for adjusting the mold to the thickness of each matrix, means for casting type from said matrices, means for distributing said matrices, assembling the type into line, and thereafter justifying said line.

47. In a typographic machine, justifying mechanism comprising a pair of jaws to engage the ends of the line, and means for moving the jaws simultaneously into and out of the path of the line, in combination with a series of stops either one of which is adapted to coöperate with one of said jaws to limit the expansion of the line.

48. In a typographic machine, justifying mechanism comprising a pair of jaws arranged to engage the ends of the line of type, one of said jaws being movable to transfer the line, a series of stops each of which is adapted to engage said movable jaw to temporarily control its position, and means for justifying the line while held between said jaws.

49. In a device of the kind described, a plurality of matrices, and a plurality of magazines for storing said matrices, in combination with means for distributing said matrices to the several magazines consisting of a matrix guideway, a terminal for said guideway for each magazine, and means operated by the matrices for automatically connecting any of said terminals to said guideway as required and locking the same against movement during the passage of the matrix along said guideways.

50. In a device of the kind described, a plurality of series of matrices, each series having a distinguishing form, and a separate magazine for storing each series, in combination with means for directing each series of matrices to its appropriate magazine, consisting of a common matrix guideway, a separate terminal for said guideway for each magazine, means controlled by the form of each matrix for automatically connecting to said guideway the particular terminal for directing said matrix to its appropriate magazine, means for moving said matrices along said guideway, and means for preventing the movement of the guideways during the passage of each matrix.

51. In a device of the kind described, a plurality of series of matrices, a magazine for storing each series, a separate distributing combination bar for each magazine, and means common to the several distributing bars for advancing matrices along said bars, in combination with a guideway common to all magazines, provided with a separate terminal for each distributer bar and means for advancing matrices along said guideway and automatically directing them into the proper terminals leading to their respective distributer bars.

52. In a device of the kind described, the combination of a mold, and a vertically movable matrix carrier adapted to first stop the matrix before the mold and, after the engagement of the matrix and the mold, press the matrix upward to produce accurate alinement between the matrix and mold.

53. In combination with the melting pot and the self-adjusting mold, the matrix carrier vertically movable and adapted to first stop the matrix before the mold, and, after engagement of matrix and mold, press said matrix upward to effect the alinement.

54. In a composing machine, casting mechanism, means for selectively controlling the movements of a plurality of free matrices, a mold adjustable to the set width of the matrix presented to it, mechanism for releasing the desired matrices, means for moving each matrix as soon as released into casting relation with the mold, and mechanism for operating said casting mechanism to cast a single type from said matrix.

55. The combination of a plurality of matrix distributers, a carrier adapted to remove matrices from the casting position and deliver them one by one to said distributers, a longitudinally movable conductor at right angles to said distributers adapted to deliver matrices to either of said distributers as desired.

56. In a typographic machine, a plurality of matrix distributers, and a reciprocating matrix carrier arranged to deliver one matrix at a time to any of said distributers, in combination with means for automatically directing said matrix to the desired distributer.

57. The combination of a vertically reciprocal matrix carrier, a horizontally reciprocal mold, means for casting a type from a matrix, and means for discharging the matrix and the type at right angles from the path of movement.

58. The combination of a vertically reciprocating matrix carrier and a horizontally reciprocating matrix carrier, and means for transferring a matrix from one matrix carrier to the other matrix carrier.

59. The combination of two matrix carriers, reciprocating at right angles to one another, and means for transferring the matrices from one carrier to the other, one carrier adapted to deliver the matrices singly to a casting mechanism, and the other carrier adapted to deliver said matrices to a distributing mechanism.

60. In a typographic machine, means for repeatedly advancing and distributing character-representing devices and space-representing devices for the same line, means for forming lines of type and justifying space representing devices from the first named devices, and means for replacing the justifying space representing devices by permanent justifying spaces.

61. In a machine of the kind described, one or more series of matrices, a magazine for each series, a distributer for each magazine, in combination with means controlled by the matrices for delivering each matrix to its appropriate distributer, including a reciprocating carrier for advancing the matrices one by one to the distributers.

62. A typographic machine comprising means for releasing a matrix from its receptacle, means for forwarding it individually to a type-casting mechanism, means controlled by the matrices for operating the type casting mechanism, and means controlled by the matrices for individually forwarding said matrix to its appropriate distributing mechanism.

63. A matrix composing and type casting machine, provided with type forming and non-type forming matrices, means for casting type from the type forming matrices, in combination with mechanism controlled by the non-type forming matrices for making justifying spaces and placing the same between the words in the line after all the character type have been cast.

64. The combination of means for casting individual type from matrices presented one by one to a casting mechanism, and assembling said type in a line with wedge-shaped temporary spacers between the words, means for simultaneously adjusting all the spacers, means for successively removing said spacers and inserting permanent spaces in said line in lieu of said temporary spacers, and means for returning said spacers to their initial position.

65. The combination with means for casting and assembling a line of type from suitable matrices, means controlled by the matrices for introducing temporary justifiers between the words, means for forcing in said justifiers, and means for casting spaces and inserting them in lieu of the temporary justifiers.

66. The combination of means for releasing character representing devices and space representing devices from a series of magazines, means for casting a type from each character representing device and assembling said type in a line, means for inserting temporary spreading spacers in said line between the words as assembled, means for spreading the line by adjusting said spreading spacers, to justify it, and means for substituting permanent spaces for said temporary ones.

67. The combination of means for inserting temporary spreading spacers in a line of type, said means being automatically controlled by space representing devices, means for simultaneously expanding said spacers to justify said line, and means for replacing said temporary spacers with permanent ones.

68. The combination of means for releasing matrices and casting therefrom the individual units of a line and assembling them in a line with wedge-shaped temporary spacers between the words, means for adjusting said spacers to justify said line, means for removing each temporary spacer and inserting a permanent one in lieu thereof and means for delivering the line to a galley.

69. In an organized machine for casting the character bearing units of a line of type, the combination of a series of temporary spreading spacing devices inserted in intervals in the line of type, means for causing said spacers to expand the line, means for casting and substituting a permanent space for each temporary spacer, and means for readjusting the remaining spacers after each successive substitution.

70. The combination of mechanism for selecting matrices whose thickness determines the set width of the type subsequently cast therefrom, means for casting said type and depositing them in a line, and mechanism for thereafter casting justifying spaces and inserting them in said line.

71. A mechanism for justifying lines of individual type composed with temporary wedge-shaped spacers, comprising means for successively casting permanent spaces and inserting them in the line in lieu of said temporary spacers, the size and number of said permanent spaces being wholly controlled by said temporary spacers, and means for readjusting the line after each substitution and casting and inserting a final justifying space.

72. In a typographic machine, a mold, a wedge-shaped temporary spacing device controlling the adjustment of the mold, a melting pot, means for operating the melting pot to force metal from the pot into the mold, and means for substituting in a line of previously composed type, the cast space for said temporary spacing device, and means for readjusting the mold to cast the final justifying space.

73. In a typographic machine, an adjustable mold, a permanent wedge controlling the adjustment of the mold, and means for adjusting said mold to correspond with the adjustment of temporary spacing devices positioned in a line of type, in combination with means for automatically forming a permanent space in said mold for each temporary spacer and positioning the same in said line of type and means for readjusting the mold for each space in the line.

74. In a machine for assembling and justifying type, mechanism for forming the lines with space wedges between the words, a space mold, means controlled by said wedges for adjusting the mold to cast justifying spaces for the line, means for successively removing the space wedges and inserting the justifying spaces, and means for readjusting the mold after each substitution.

75. In a machine for assembling and justifying lines of type with temporary wedge-shaped spacers between the groups of characters, a low space mold, and means controlled by said spacers for successively casting justifying spaces therein, an ejector for ejecting said spaces from said mold and inserting them in the line, and means for making a final justification of the line before the last space is cast.

76. In a machine for justifying an assembled line of type with wedge shaped temporary spacers between the words, an adjustable mold and means for adjusting it to conform to the size of spaces indicated by said temporary wedge-shaped spacers, a casting device and means for operating it to cast permanent justifying spaces in succession to replace the temporary spacers, means for successively moving said mold to the ejecting point and advancing said line to bring said temporary spacers in succession before said ejecting point, and means for successively removing said temporary spacers and inserting said justifying spaces in the line.

77. A type justifying mechanism comprising, in combination, temporary spreading devices between the words in a line, mechanism for operating the spreading devices, space forming mechanism controlled by said spreading devices, means for successively removing said spreading devices, and forming and substituting therefor permanent spaces, and means for readjusting said spreading devices after each substitution.

78. In a typographic machine, a plurality of matrices, duplicate magazines for storing said matrices, and a fixed separate entrance guide for each magazine, in combination with an adjustable raceway adapted to direct the matrices into either magazine, means controlled by the matrices for adjusting the raceway, and means for advancing the matrices one by one along said raceway.

79. The series of vertical fixed matrix magazines, and a separate distributing bar for each magazine, in combination with a coöperating raceway and a movable guide controlled by the matrices adapted to direct the matrices in either magazine.

80. The series of vertical fixed magazines, an overlying distributer for each magazine, in combination with a movable pathway for the matrices and means automatically operated by the engagement of the matrices therewith for changing the position of the pathway to deliver matrices to either distributer.

81. The series of channeled magazines, a fixed distributer over each magazine, and a reciprocating carrier for delivering matrices one by one from the casting point directly to either magazine.

82. In a typographic machine, a plurality of matrices, a series of channeled magazines for containing said matrices and a separate distributer for each magazine, in combination with a single raceway leading to the several magazines, and means controlled by the matrices for deflecting said matrices from said raceway into their appropriate magazine.

83. In a composing machine adapted to operate upon an assembled line of type and expansible spacers, means for expanding spacers to justify the line, means for forming justifying spaces and inserting them in the line, and means controlled by the movements of the spacers for adjusting the width of the mold after each space is inserted.

84. In a typographic machine adapted to operate upon a line of individual type, with space wedges between the words in said line, means for justifying the line by the movement of said space wedges, a variable space mold and a wedge controlled by said justifying means for adjusting said space mold to correspond to the width of the opening between the words in the line, and means for readjusting the mold for each space in the line.

85. The two part mold, having a sliding member to vary its width, and opposing jaws carried by said mold between which the matrices may be confined to control the "set" width of the type cast therein, and means for confining the matrices between the jaws.

86. In a typographic machine, a plurality of matrices whose thickness determines the width of the type cast therefrom, a series of channeled magazines for containing said matrices, and means for selectively releasing said matrices from the magazines, in combination with means for measuring the thickness of each matrix released, and means for casting a single type from each matrix.

87. In a typographic machine, mechanism controlled by the number of intervals in a line of type for casting justifying spaces for said line, comprising a permanent wedge and connecting means for adjusting said justifying mechanism to the proper dimension and means for readjusting said justifying mechanism for each space in the line.

88. In a typographic machine, the combination of an adjustable mold for casting character bearing type and an adjustable mold for casting non-character bearing type, and mechanism coöperating with said mold arranged to first cast all the character bearing type and thereafter to cast all the non-character bearing type.

89. In a typographic machine, a constantly operated type-casting mechanism in combination with an intermittently operated space-casting mechanism, an adjustable mold for each mechanism, and means for controlling the adjustment of the molds.

90. In a typographic machine, the combination with means for assembling matrices and casting type, of means for assembling said type with separators between the words, and means for casting justifying spaces, said space-casting mechanism being intermittently operated, and means brought into action by the matrices and separators for starting and stopping the space-casting mechanism.

91. In a typographic machine, a plurality of matrices, a matrix magazine, in combination with means for releasing matrices from the lower end of said magazine, successively casting individual type from said matrices and means for returning said matrices to the upper end of said magazine in the order and at the speed of their composition.

92. In a typographic machine, the combination with a mold, of means for successively presenting matrices of various forms thereto and means for independently adjusting the mold for each matrix and casting type therein, and a justifying mechanism controlled by the movement of certain forms of said matrices through the type casting mechanism.

93. A typographic machine comprising a plurality of series of matrices, each series of peculiar form, means for storing said matrices, mechanism for selectively releasing said matrices and moving them through a common path, a typecasting, a line transferring and a justifying mechanism, one form of said matrices being adapted to control the operation of said typecasting mechanism, a second being adapted to control said line transferring mechanism, and another to control said justifying mechanism, and means for returning said matrices to their storage receptacles.

94. In a machine for casting and composing individual type, a plurality of type forming and non-type forming matrices, a type mold, means for selectively presenting any of said matrices to said mold, casting a type from each type-forming matrix and assembling said type into line, in combination with means controlled by the non-type forming matrices for inserting temporary spacers in the line and subsequently substituting therefor permaent justifying spaces.

95. In a machine of the kind described, a plurality of type forming and non-type forming matrices, a type mold, means for selectively presenting any of said matrices to said mold, casting type from each type forming matrix and assembling said type into line, in combination with means controlled by the non-type forming matrices for justifying the line.

96. In a machine of the kind described, a plurality of type forming and non-type forming matrices, a type mold, means for selectively presenting any of said matrices to said mold, casting type from each type forming matrix and assembling said type into line, in combination with means controlled by the non-type forming matrices for transferring and justifying the line and positioning said line in a galley.

97. In a typographic machine, a channeled magazine and means for releasing matrices therefrom, in combination with a calipering device, means for passing each matrix through said calipering device and an indicating device operated by said calipering device.

98. In a device for producing justified lines of type having a plurality of matrices, a type mold, means for selecting said matrices and means controlled by said matrices for adjusting the mold to the proper dimensions, in combination with means for casting single type characters in said mold, and assembling them in line, and means for thereafter justifying said type line.

99. In a typographic machine, a series of character matrices, type casting mechanism and means for successively presenting said matrices to said casting mechanism and casting individual type therefrom, in combination with a series of temporary spacers, means for inserting said spacers in the line of type, a space mold, and means for successively casting permanent justifying spaces therein.

100. In a typographic machine, the combination of means for assembling a line of type, a space mold for forming justifying spaces, and means for inserting said spaces in the line, means for readjusting said line after each space is inserted and means controlled by said readjusting means for producing a final justifying space.

101. In a typographic machine, a matrix carrier, comprising a duct provided with a stationary and a longitudinally movable side, a plurality of movable dogs evenly spaced along said stationary side and a plurality of similarly spaced dogs mounted upon said movable side, in combination with means for reciprocating said movable side and means for placing a matrix in position to be engaged by said dogs.

102. In a typographic machine, a matrix carrier, comprising a duct provided with a stationary and a longitudinally movable side, a plurality of sets of movable dogs, evenly spaced from each other, mounted upon said stationary side, and a plurality of similar sets of dogs similarly mounted upon said movable side, in combination with means for reciprocating said movable side so that a matrix engaged by one dog of a set will be engaged and temporarily controlled by a corresponding dog in each set as it moves along the duct, and means for supporting a matrix in position to be engaged by any desired dog in a set.

103. In a typographic machine, a plurality of matrices, a magazine for storing said matrices, a distributing mechanism for said magazine and means for casting a single type from any of said matrices, in combination with means for selectively discharging the matrices from said magazine, a receiver to receive said matrices so discharged, a carrier arranged to successively transfer the matrices from the receiver to the casting mechanism, and a secondary carrier to successively transfer the matrices to the distributing mechanism.

104. In a typographic machine, a plurality of matrices each adapted to form a plurality of characters, a magazine for storing said matrices, and means for casting a single type from any of said matrices, in combination with means for selectively discharging the matrices from said magazine, a receiver to receive the matrices so discharged, a carrier arranged to transfer the matrices singly from said receiver to said casting mechanism and present the desired character to the mold, and means for successively placing a single matrix upon said carrier at varying elevations.

105. In a typographic machine, a plurality of matrices, a magazine for storing said matrices, a distributer for said magazine, and means including a mold for casting a single type from any of said matrices, in combination with means for selectively discharging matrices from said magazine, a receiver to receive the matrices so discharged, a carrier arranged to successively transfer said matrices from the receiver to the mold, means for adjusting the mold to the thickness of the matrix, casting a type and then withdrawing the matrix from the mold and delivering the same to said distributer.

106. In a device of the kind described, a plurality of type matrices the width of each matrix being the same as the characters formed upon the edge thereof, an adjustable mold, means for presenting any character on said matrices to the mold, engaging means formed on the mold parts adapted to engage the sides of said matrices and dimension the mold to the width of the matrix presented to it, and means for casting type in said mold.

107. In a typographic machine, a plurality of matrices each provided with a plurality of casting faces, a matrix carrier comprising a duct and a plurality of sets of fixed, and a plurality of sets of longitudinally movable pivotally mounted dogs extending into said duct, the distance between the dog faces in each set corresponding to the distance between the casting faces on said matrices, in combination with means for reciprocating said movable dogs so that a matrix engaged by one dog of a set will be successively advanced to a corresponding dog of the next set at each reciprocation of said dogs.

108. In a typographic machine, a plurality of matrices, each provided with a plurality of casting faces, a matrix carrier comprising a duct, a plurality of series of matrix supporters projecting into said duct the distance between the several supporters in each series corresponding to the distance between the casting faces on said matrices, matrix engaging means projecting into said duct and adapted to move longitudinally thereof, in combination with means for reciprocating said engaging means so that a matrix will be moved successively from any supporter in a series to the corresponding supporter in the next succeeding series and a single movable supporter in place of the initial series at the entrance to said duct, which may be moved as desired to temporarily occupy the position of each supporter in the series.

109. In a device of the kind described, a carrier comprising a duct, a plurality of series of dogs projecting into said duct, and regularly spaced from each other, a single stop arranged to occupy the position of the initial series at the entrance to said duct and movable to temporarily occupy the position of each dog in the series, in combination with movable engaging means for moving a matrix successively from a position at one series of dogs to a corresponding position at the next succeeding series and means for controlling the position of said stop.

110. In a device of the kind described, a movable mold, means for casting a type in said mold, means for ejecting a type longitudinally from said mold into an assembling space and means for alternately placing said mold in its casting, and its ejecting positions, in combination with means for moving each type as ejected longitudinally of the assembling space, and means for inserting a temporary spacer between the several groups of type composing each line.

111. In a typographic machine, a plurality of series of matrices, each series being of peculiar form, means for casting type therefrom and assembling them in line, and means for moving all of said matrices in a fixed path, one of said series of matrices being provided with means for automatically starting the operation of the type casting mechanism, one of said series being provided with means for automatically inserting temporary spacers in the line, and another of said series being provided with means for automatically starting a line transferring and justifying mechanism.

112. In a typographic machine, type casting mechanism, and means for assembling the type cast into lines, means for transferring each line from the assembling position, and mechanism for inserting justifying spaces in said line, said machine being provided with a plurality of matrices each adapted to start the operation of some portion of the machine, and means for selecting said matrices and moving the same in a fixed path, whereby the operation of the machine is automatically controlled.

113. In a machine of the kind described, a plurality of type forming and non-type forming matrices, a type mold, means for selectively presenting any of said matrices to said mold, and adjusting its width to conform thereto, means for casting type from each type forming matrix and assembling said type into line, in combination with means controlled by the non-type forming matrices for justifying the line.

114. In a machine of the kind described, a plurality of type forming and non-type forming matrices, a type mold, means for selectively presenting any of said matrices to said mold, and adjusting its width to conform thereto, means for casting type from each type forming matrix and assembling said type into line, in combination with means controlled by the non-type forming matrices for transferring and justifying said line and positioning said line in a galley.

115. In a type casting machine, a plurality of type forming and non-type forming matrices, a type mold, and means for casting type, in combination with means for preventing the operation of the type casting means when a non-type forming matrix is presented to the mold.

116. In a device of the kind described, a plurality of matrices, whose thickness determines the width of the type cast therefrom, magazines for storing said matrices, means for releasing said matrices and elevating them step by step to a type casting mechanism.

117. In a device of the kind described, a plurality of matrices, whose thickness determines the width of the type cast therefrom, magazines for storing said matrices, means for releasing said matrices and elevating them step by step to a typecasting mechanism, means for casting type from said matrices and means for returning them to their magazines.

118. In a typographic machine, a plurality of matrices each provided with a plurality of characters, means for releasing said matrices and assembling them at varying levels, in combination with means for elevating them one by one at varying levels to a typecasting mechanism and placing any one of the characters on any matrix in alinement with the type mold.

119. In a device of the kind described, a plurality of series of matrices each bearing a plurality of type-forming faces, a plurality of matrix-containing magazines with an overlying distributer for each magazine, and a type casting mechanism, in combination with means for assembling said matrices and presenting them one at a time to the type casting mechanism at such elevations as will present the desired face in alinement with the mold, and means for casting a type from each of said matrices and returning each matrix directly to its appropriate distributer.

120. A matrix composing and type casting machine, comprising a plurality of matrix-containing magazines, and means for distributing matrices into said magazines, a type mold, and means for casting type therein, means for releasing matrices from said magazines, a vertically reciprocal matrix carrier for presenting said matrices to said type mold, and a horizontally reciprocal matrix carrier for delivering said matrices from the mold to the distributer.

121. In a typographic machine, a type mold, a plurality of matrices each provided with a plurality of characters, means for assembling said matrices, and a channel in which said matrices are received, in combination with a reciprocal carrier provided with means for receiving the matrices at various elevations, means for placing the matrices in the carrier at suitable elevations and reciprocating the carrier to present the matrix with the desired character in alinement with the type mold.

122. In a typographic machine, a plurality of matrix containing magazines, a type mold positioned near the top of said magazines and means for selectively releasing matrices from said magazines, in combination with a channel arranged to receive the matrices as released, means for removing said matrices one by one, from said channel and mechanism for elevating them to the height of and presenting them to, said mold.

123. In a typographic machine, a plurality of matrices and means for advancing them one by one at varying elevations to a type casting mechanism, in combination with means for measuring the thickness of said matrices as they are advanced singly to the casting mechanism.

124. A typographic machine comprising a plurality of vertical matrix-containing channels and means for releasing matrices from the lower end thereof, means for elevating said matrices to substantially the level of the upper end thereof, casting type therefrom and depositing said matrices in their appropriate channels.

125. In a matrix composing and distributing machine, a plurality of series of matrices of varying form, each matrix of each series being adapted to be presented to a type mold and there engage with adjacent parts to control the subsequent paths of said matrices.

126. In a matrix composing and distributing machine, a plurality of series of matrices of varying form, each matrix of each series adapted to be presented to a type mold, underlying and overlying devices adapted to be engaged by said matrices to control their subsequent paths, and means for causing each matrix to engage with either or both of said underlying and overlying devices to cause each matrix of the same series to traverse an identical path, and matrices of different series to traverse different paths.

127. In a matrix composing and distributing machine, a plurality of series of matrices of varying form, each matrix of each series adapted to be presented to a type mold, underlying and overlying devices adapted to be engaged by said matrices to control their subsequent paths, and means for causing each matrix to engage with either or both of said underlying and overlying devices to cause each matrix of the same series to traverse an identical path, and matrices of different series to traverse different paths, and means for moving said matrices along said paths and distributing them.

128. In a typographic machine, a plurality of magazines, a plurality of series of matrices, each series of a different form, a series of justifying spacers, and means controlled and operated by one of said series of matrices for releasing said justifying spacers from their magazine.

129. In a device of the kind described, a type mold, a plurality of matrix containing magazines, with an overlying distributer for each magazine, and means for releasing said matrices and presenting them singly to the type mold, in combination with a carrier adapted to first press each matrix against the mold with its desired character in alinement with the mold cell, and thereafter deliver each matrix to its appropriate distributer.

130. In a typographic machine, provided with a plurality of series of matrices, a magazine for each series and a distributer for each magazine, in combination with a typecasting mechanism, and means for releasing said matrices and presenting them to said typecasting mechanism, means for delivering the matrices of each series to its appropriate distributer, comprising a plurality of movable stops for controlling the path of each series of matrices.

131. In a typographic machine provided with a plurality of series of matrices, a magazine for each series, a distributer for each magazine, type casting mechanism, means for releasing said matrices and presenting them to said casting mechanism, means for delivering said matrices to their appropriate distributers comprising a plurality of movable stops for controlling the path of said matrices and means controlled by the matrices for moving said stops.

132. Mechanism for transferring to and placing in a galley a line of type containing a plurality of individually justified sections, comprising opposing members between which said sections are justified, a series of stops, any of which are adapted to engage with one of said members to determine the length of said sections, means for justifying the line sections, and means for assembling said sections and placing them in a galley.

133. Mechanism for placing in a galley a line of type containing a plurality of independently justified sections, comprising a pair of movable jaws, adapted to confine said line and regulate the length of the various sections, a plurality of dogs adapted to engage with and limit the movement of one of said jaws, means for justifying the various sections while confined between said jaws, and means for assembling the various sections and depositing the completed line in a galley.

134. In a type justifying device, opposing members for confining the line, and a series of stops in the path of one of said members adapted to determine the final position thereof, means for transferring a line of type from the assembling to the justifying point and positioning said line between said opposing members, means for determining the size of justifying spaces which will exactly justify said line, means for inserting said spaces, and means for transferring the justified line to a galley.

135. In a type justifying mechanism, and in combination, a pair of movable jaws adapted to confine a line of type, one of said jaws movable at right angles to the path of movement of the other, means for moving one of said jaws to transfer a line of previously composed type to the justifying point and there confine it between both of said jaws during the process of justification, means for retracting said jaws thereafter and means for transferring the justified line to a galley.

136. Mechanism for placing in a galley a justified line of type, comprising a pair of movable jaws adapted to confine said line, a plurality of dogs, any one of which is adapted to limit the movement of one of said jaws, means for justifying said line while confined between said jaws, and means for transferring the justified line to a galley.

137. In a composing machine, mechanism for assembling and justifying a line of individual type, comprising a pair of movable jaws adapted to confine said line, a plurality of dogs any one of which is adapted to limit the movement of one of said jaws, means for justifying said line while confined between said jaws and means for transferring the justified line to a galley.

138. In a device of the kind described, means for assembling a line of individual type with temporary spacers at intervals therein, means for expanding said spacers, means controlled by said temporary spacers for forming justifying spaces and inserting them successively in said line in lieu of said temporary spacers, means for successively extracting said temporary spacers and means controlled by the temporary spacers for successively presenting said spacers to the extracting means.

139. In a type justifying device, a temporary spacer magazine and means for introducing said temporary spacers in a line of type, means for substituting therefor permanent justifying spaces, means for successively extracting said temporary spacers and placing them in a carrier, and means for reciprocating the carrier to deliver them to their magazine.

140. In a type justifying device, a magazine for temporary spacers, means for releasing spacers from said magazine and introducing them into a line of type, mechanism for substituting for said temporary spacers permanent justifying spaces, means controlled by the space substituting means for extracting said temporary spacers from the line, one at a time, means for rejustifying the line for each spacer extracted, and mechanism for placing each spacer in a carrier, and means for returning them one at a time to their magazine.

141. In a justifying device, means for introducing temporary wedge shaped spacers in a line of type, a pair of jaws between which a line of type and spacers is confined and justified by adjusting said spacers, means for substituting permanent justifying spaces for said temporary ones, an extractor coöperating with said substituting means for successively removing said temporary spacers by engaging the upper ends thereof, and means for relieving the pressure of said jaws during the removal of the temporary spacers.

142. In a justifying device, and in combination, means for transferring to and depositing in a galley a justified line of type consisting of a plurality of independently justified sections, comprising a pair of separable plates upon which the various type sections are assembled, a member projecting into the pathway of said line and adapted to engage the foremost of said type sections, and means operated by said member for separating the plates and depositing the line in the galley upon the engagement of said member by a type section.

143. In a justifying device, and in combination, means for transferring to and depositing in a galley a justified line of type, comprising a pair of separable plates upon which the type are assembled, a member projecting into the pathway of said line and adapted to engage the foremost of said type, and means operated by said member for separating the plates and depositing the line in the galley upon the engagement of said member by said type.

144. In a justifying device, and in combination, means for transferring to and depositing in a galley a justified line of type, comprising a pair of separable plates upon which the type are assembled, a member projecting into the pathway of said line and adapted to engage the foremost of said type, and means operated by said member for separating the plates and depositing the line in the galley upon the engagement of said member by said type, and means for restoring the parts.

145. In a justifying device, and in combination, means for assembling a line of type with temporary spacers between the words thereof, means for transferring the line to a justifying position and automatically starting mechanism which first adjusts said temporary spacers and then successively removes them and forms and substitutes therefor permanent justifying spaces, and means controlled by the temporary spacers for stopping the removing and substituting means.

146. In a typographic machine, means for recording the thickness of type composed, consisting of two parallel bars, one of which is adapted to move a distance equal to the thickness of each type as composed, a scale upon the other bar for recording the aggregate thickness of all the type in a line, an indicator and engaging means common to both bars, and means for moving one of said bars and advancing the indicator along said scale on the other.

147. In a justifying device, means for substituting in a line of type permanent justifying spaces for temporary spacers between the words in the line, automatic mechanism for starting the substituting means, and means controlled by the number of, and adapted to successively engage, the temporary spacers in the line for stopping the operation of said substituting means.

148. In a justifying means for substituting permanent justifying spaces for temporary spacers between the word groups, mechanism for starting the substituting means, and means lying in the path of, and controlled by the number of, the temporary spacers, for stopping the operation of the substituting means.

149. In a device of the kind described, the combination of a mold, and a vertically movable matrix carrier adapted to separately engage each matrix and elevate it to the mold, and after engagement of the matrix and the mold, press said matrix upward to affect the alinement.

150. A typographic machine comprising matrices of varying forms, in combination with a typecasting mechanism controlled by one form of said matrices and a separate justifying mechanism controlled by another form of said matrices.

151. In a typographic machine, a type mold, magazines for storing a plurality of matrices and mechanism for individually releasing said matrices from one end of said magazines and separately presenting them to said type mold, opposing surfaces on said mold between which said matrices are clamped to gage the set-wise dimensions thereof, means for casting type in said mold and assembling them in justified lines, and means for returning said matrices to the opposite end of said magazines.

152. In a typographic machine provided with magazines containing matrices corresponding in thickness with the set-width of the corresponding type, means for selectively releasing said matrices from one end of said magazines, a mold for casting type, the set-wise dimension of which is controlled by said matrices, means for depositing said type in a line, and means for returning said matrices to the opposite end of said magazines.

153. In a typographic machine, a metal pump, a mold and means for presenting character representing devices and space representing devices to said mold, in combination with means for permitting the operation of said metal pump when said character representing devices are presented to said mold and means for preventing the operation of said metal pump when said space representing devices are presented to said mold.

154. In a typographic machine provided with a plurality of type forming and non-type forming matrices and wedgeshaped temporary spacers, means controlled by said type forming matrices for forming a line of individual type, and means controlled by said non-type forming matrices for automatically placing said spacers in said line, a mold controlled by said spacers, and means for casting permanent justifying spaces therein, in combination with means for successively replacing all said temporary spacers in the line with said permanent spaces.

155. The combination with justifying mechanisms of means controlled by the number of intervals in a line of individual type for casting justifying spaces for said line, comprising a permanent wedge and connecting means controlled by said justifying mechanism for successively forming said justifying spaces of the proper dimensions, and means whereby the justifying mechanism is operated for each space in the line, and mechanism for producing a final justifying space.

In testimony whereof, I have hereunto signed my name in the presence of two subscribing witnesses.

JOHN S. THOMPSON.

Witnesses:
BURTON U. HILLS,
CHARLES I. COBB.

Copies of this patent may be obtained for five cents each, by addressing the "Commissioner of Patents, Washington, D. C."